(12) United States Patent
Sydor

(10) Patent No.: US 7,194,269 B2
(45) Date of Patent: Mar. 20, 2007

(54) METHOD AND WIRELESS COMMUNICATION HUB FOR DATA COMMUNICATIONS

(75) Inventor: John T. Sydor, Ottawa (CA)

(73) Assignee: Her Majesty the Queen in right of Canada, as represented by the Minister of Industry, Ottawa (CA)

( * ) Notice: Subject to any disclaimer, the term of this patent is extended or adjusted under 35 U.S.C. 154(b) by 686 days.

(21) Appl. No.: 09/984,403

(22) Filed: Oct. 30, 2001

(65) Prior Publication Data

US 2002/0090979 A1    Jul. 11, 2002

(30) Foreign Application Priority Data

Oct. 30, 2000    (CA)    .................................. 2324692

(51) Int. Cl.
*H04Q 7/20*    (2006.01)

(52) U.S. Cl. .................... 455/446; 455/447; 455/452.2; 455/562.1

(58) Field of Classification Search ................ 455/450, 455/452.1, 452.2, 446, 447, 448, 456.1, 456.5, 455/456.6, 561, 562.1
See application file for complete search history.

(56) References Cited

U.S. PATENT DOCUMENTS

| | | | | |
|---|---|---|---|---|
| 3,887,926 A | * | 6/1975 | Schwartz et al. | 343/816 |
| 5,548,813 A | * | 8/1996 | Charas et al. | 455/562.1 |
| 5,966,094 A | * | 10/1999 | Ward et al. | 342/373 |
| 6,038,459 A | * | 3/2000 | Searle et al. | 455/562.1 |
| 6,047,175 A | * | 4/2000 | Trompower | 455/452.1 |
| 6,118,767 A | * | 9/2000 | Shen et al. | 370/252 |
| 6,167,036 A | * | 12/2000 | Beven | 370/331 |
| 6,167,286 A | * | 12/2000 | Ward et al. | 455/562.1 |
| 6,178,329 B1 | * | 1/2001 | Chao et al. | 455/452.1 |
| 6,266,514 B1 | * | 7/2001 | O'Donnell | 455/67.13 |
| 6,473,616 B1 | * | 10/2002 | Sydor | 455/446 |
| 6,574,456 B2 | * | 6/2003 | Hamabe | 455/63.3 |

* cited by examiner

*Primary Examiner*—Jean Gelin
*Assistant Examiner*—Marcos L Torres
(74) *Attorney, Agent, or Firm*—Freedman & Associates

(57) ABSTRACT

The Highly Structured Rosette Antenna Array Data Communications System is a high capacity wireless network in which data is communicated from and to remotely located subscribers. The system uses cells that are comprised of a multiplicity of oblong microcells arranged in a circle, giving the cell a rosette-like pattern like frequency channels are assigned to every $N^{th}$ microcell, where N is the number of distinctly different frequency channels. The sum of the distinctly different channels is the total bandwidth assigned to the rosette. Typically, if M is equal to the total number of microcells in the rosette, then M/N is equal to the number of like-frequency microcells in the rosette.

23 Claims, 32 Drawing Sheets

| Channel A | EIRP (dBm/MHz) |
|---|---|
| Petal 1 | 21 |
| Petal 2 | -16 |
| Petal 3 | 21 |
| Petal 4 | 18 |
| Petal 5 | 11 |
| Petal 6 | 18 |

| Channel B | EIRP (dBm/MHz) |
|---|---|
| Petal 1 | 17 |
| Petal 2 | -1 |
| Petal 3 | 23 |
| Petal 4 | 15 |
| Petal 5 | 12 |
| Petal 6 | 21 |

| Channel C | EIRP (dBm/MHz) |
|---|---|
| Petal 1 | 8 |
| Petal 2 | 8 |
| Petal 3 | 23 |
| Petal 4 | 12 |
| Petal 5 | 12 |
| Petal 6 | 22 |

| Channel D | EIRP (dBm/MHz) |
|---|---|
| Petal 1 | -1 |
| Petal 2 | 16 |
| Petal 3 | 21 |
| Petal 4 | 12 |
| Petal 5 | 15 |
| Petal 6 | 23 |

Fig. 15

| Modulation Techniques | Best Configuration | 2$^{nd}$ Best Configuration | Worst Configuration |
|---|---|---|---|
| Mixed | 3 | 2 | 1 |
| BPSK | 1 | 2 | 3 |
| QPSK | 2 | 3 | 1 |
| 16QAM | 2 | 3 | 1 |
| 64QAM | 3 | 1 | 2 |

Fig. 22

METHOD AND WIRELESS COMMUNICATION HUB FOR DATA COMMUNICATIONS

FIELD OF THE INVENTION

The present invention relates to broadband communication networks and more particularly to wireless broadband communications.

BACKGROUND OF THE INVENTION

In the past, broadband communication was achieved by providing high bandwidth cable connections between a provider and a client. The cables are commonly in the form of coaxial cables, twisted pair copper telephone lines, or fibre optic cables. A broadband signal is transmitted down the cable toward the client end. For example, cable television involves a same signal transmitted to each client within a group of clients. The signals are sent in one direction only thus providing a one directional data link, Each client then decodes portions of the signal as desired.

Information being sent to the clients, commonly called the down link or forward link, is usually transmitted at a much higher capacity than the up link or return link. Such asymmetry in communications prevents clients from both generating and distributing substantial amounts of information into the network. As a consequence, the distribution of high content information by the network is exceedingly hierarchical, requiring the producers of information to access the hub nodes wherefrom the information is transmitted to the clients. Generally, subscribers desire a high bandwidth feed from a service provider and lower bandwidth feed to the service provider. An arrangement is similar for television on demand where television programs are provided to a client from the service provider and clients only send small data packets including ordering information etc. to the service provider.

It is well known that one of the most expensive aspects of any broadband communication network is the cost of running cable from a service provider to each client. For example, fibre optic cables are estimated to cost tens of thousands of dollars per mile of installed cable This results from labour costs, costs of routing the cables and obtaining rights to bury the cables, costs of repairing damaged cables and so forth. It would be highly advantageous to obviate any need to lay new cable in order to support broadband communication over a wide area and more particularly bidirectional communication between a service provider and a client subscriber or between client subscribers, especially in view of the growing need by clients to be able to access and use ever increasing amounts of return link capacity. Additionally, adding the capability to existing wireline infrastructure is expensive and problematic, often requiring the special conditioning of old lines or the addition of new infrastructure. In many areas, infrastructure is simply not in place, forcing those desiring broadband communications to face the daunting task of not only installing links to clients, but also installing totally new switching systems.

The convergence of the Internet and television services has given rise to a need to provide high bandwidth bi-directional communication. Other applications such as video conferencing, require high bandwidth in both transmit and receive directions. Conventional broadband data distribution services are not capable of supporting such requirements.

In an attempt to overcome this problem, cable service providers have released a cable modem for use in providing Internet services over a standard cable connection. Such a connection has many known problems. The bandwidth is limited by the cable itself and division of subscribers into groups requires the addition of new hardware. The bandwidth to any given client is limited by the number of active subscribers in their group and by the physical limitations on the information carrying capacity of the coaxial cable. Further, such a system is highly asymmetric and incapable of, for example, supporting extensive video interactivity between client subscribers.

Telephone system operators have also tried to overcome the above noted problems with broadband data distribution by developing high speed modems that condition signals for distribution over twisted pair telephone lines. These modems, called Digital Subscriber Line (DSL) modems, are most commonly represented by a class of modems called Asymmetric DSL (ADSL). Some of the drawbacks of these systems are that they require the twisted pair telephone lines to be in good condition in order that the modems can be effectively used.

Also, networks employing ADSL are highly asymmetrical, having forward link capacity significantly larger than return link capacity. In addition, unless the ADSL links are in good condition and relatively short, supporting high quality video services becomes problematic. Another significant problem faced with ADSL is the requirement for a public telephone subscriber line network to be in place in order to facilitate deployment. Such a requirement for an in-place infrastructure is simply impossible in many regions of the world, hence deployment of ADSL is limited to those regions that are well developed economically and have a solid technological base.

Another attempt to overcome the above known problems is known Local Mutlipoint Distribution Service (LMDS) or Local Multipoint Communication Systems (LMCS). LMDS (LMCS) is a wireless, two-way broadband technology designed to allow network integrators and communication service providers to bring a wide range of high-value, quality services to homes and businesses. Services using LMDS technology include high-speed Internet access, real-time multimedia file transfer, remote access to corporate local area networks, interactive video, video-on-demand, video conferencing, and telephony among other potential applications.

In the United States, the FCC became interested in the possibility of LMDS bringing long needed competition to the telecommunication marketplace, where it has the use of 1.3 GHz of RF spectrum to transmit voice, video and fast data to and from homes and businesses. With current LMDS technology, this roughly translates to a 1 Gbps digital data pipeline. Canada already has 3 GHz of spectrum set aside for LMCS. Many other developing countries see this technology as a way to bypass the expensive implementation of cable or fiber optic networks.

LMDS uses low powered, high frequency (25–31 GHz) signals transmitted over a distance of 3–5 kilometers. These zones of coverage, or cells, are created by sectorial antennas and switching systems mounted on rooftops of urban buildings and towers. These cells are typically spaced 4–5 kilometers (2.5–3.1 miles) apart. LMDS cell layout determines the cost of building transmitters and the number of households covered. With circular cells of 4 kilometers in radius, about 50 square kilometers falls within a single cell. In urban areas, this translates to about 80,000 homes within a single cell.

Despite the promise of LMDS there are a number of issues that compromise its acceptance as a widely deployed and ubiquitous wireless multimedia distribution system. One significant drawback to the deployment of LMDS systems is the large signal attenuation that is faced by the frequencies used in transporting the data between the hub and subscriber terminals. This signal attenuation is exacerbated by rain, foliage, building blockage, and other factors related to the absorption, refraction, or reflection of the signal by obstacles in the propagation path. The underlying phenomena are well understood but are of such severity that current deployments of LMDS are limited to situations where the links are free from obstructions and where attenuation by rain or snow is sufficiently countered.

Another issue, also related to propagation characteristics, is that the intended polarization reuse schemes for increasing the capacity of LMDS systems are also prone to degradation by the same phenomena that attenuate the signal. As a consequence there are issues of deployment and capacity, which bring into question the economic viability of LMDS systems.

Though there is much promise in LMDS systems operating at 28 GHz, the effect of the propagation environment makes wide scale deployment problematic. Though initial expectations assumed this technology could provide services to everybody within a coverage area, most current plans are for providing service only to those locations where a signal is received without even nominal propagation impairments. Also, current trends in LMDS are mainly for providing commercial access to broadband communication.

In view of the problems faced by LMDS due to its use of frequencies around a 28 GHz band, the most obvious solution to the above noted problems is to develop a system using frequencies more robust to propagation degradation. Typically these frequencies are in bands substantially lower than 28 GHz. The difficulty with using bands at lower frequencies is that there is insufficient bandwidth to support the density of communications demanded by broadband digital services and what bandwidth is available is often shared with other users such as satellite systems or dedicated point to point communications links. In order to effectively use other frequency bands for broadband wireless communications it is therefore necessary to devise a system which can co-exist with primary users and in addition, use limited bandwidth in such a manner that effective broadband communications can be established. At present, such a solution is unavailable for use with the types of data throughput anticipated and currently required.

A great deal of the early discussion of LMDS applications centered on the transmission of video. With the recent surge of interest in the Internet and the accompanying demand for bandwidth, fast data appears to be the greatest application for this technology. With 1.3 GHz of spectrum, LMDS can provide a pipeline for a great deal of data. Homeowners pay about $30 per month for video, but businesses regularly pay over $1000/month for a high speed T1 (1.544 Mbps) line from phone companies.

Using only the 850 MHz unrestricted bandwidth, along with a modulation scheme such as quadrature phased shift keying (QPSK), well over 100 T1 equivalent lines can be provided in a cell formed by an omnidirectional LMDS transceiver even without splitting cells into separate sectors. Though it has been proposed that by using horizontal and vertical polarized sectors within a cell, LMDS providers can re-use bandwidth and multiply the number of T1 equivalents available, insufficient polarisation isolation makes such claims dubious especially in applications wherein subscribers are individuals and not businesses. A typical commercial LMDS application is believed to be able to provide a downlink throughput of 51.84–155.52 Mbp/s and a return link of 1.544 Mbp/s (T1). This capacity translates into potential to provide "full service network" packages of integrated voice, video and high-speed data services. Actual service carrying capacity depends on how much of the spectrum is allocated to video versus voice and data applications. Assuming that 1 GHz of spectrum is available, an all-video system could provide in the order of 275 channels of digital broadcast quality television plus on-demand video services. Unfortunately, LMDS has many known drawbacks and even though an LMDS television system was installed in Brooklyn in the early 1990's, it has failed to find wider acceptance.

It is an object of the present invention to provide a robust broadband wireless communication system for use in delivering data from a service provider to a plurality of clients. It is another object of the present invention to provide a system for operation at lower frequencies than LMDS, which provides many of the benefits of LMDS without many of the drawbacks.

SUMMARY OF THE INVENTION

In accordance with an aspect of the invention, there is provided a wireless communication hub comprising:

a plurality of radiators each associated with an oblong microcell and for radiating a narrow beam outward from the hub within the oblong microcell, different radiators for radiating within different oblong microcells, radiators associated with adjacent oblong microcells for radiating within different frequency ranges such that adjacent oblong microcells are frequency isolated and at least two spatially isolated oblong microcells within a same half of a rosette are associated with radiators for radiating within a same frequency range and are for radiating beams having sufficiently low side lobe levels for providing the spatial isolation;

a plurality of modulators each for modulating a signal based on data received and for providing the modulated signal to a radiator from the plurality of radiators;

a receiver for receiving a signal relating to other wireless communication hubs, the information for use in determining configuration information of the wireless communication hub and transmitted by other than the wireless communication hub;

a processor for determining a hub configuration based on at least a received signal and for providing a feedback signal relating to the determined hub configuration; and, a control circuit for controlling the wireless communication hub in response to the feedback signal.

In accordance with another aspect of the invention, there is provided a wireless communication hub comprising:

a plurality of radiators each associated with an oblong microcell and for radiating a narrow beam outward from the hub within the oblong microcell, different radiators for radiating within different oblong microcells, radiators associated with adjacent oblong microcells for radiating within different frequency ranges such that adjacent oblong microcells are frequency isolated and at least two spatially isolated oblong microcells within a same half of a rosette are associated with radiators for radiating within a same frequency range and are for radiating beams having sufficiently low side lobe levels for providing the spatial isolation;

a plurality of modulators each for modulating a signal based on data received and for providing the modulated signal to a radiator from the plurality of radiators;

a processor for providing the data to the modulator;

a feedback port for receiving a feedback signal relating to interference caused by other than the wireless communication hub; and, a control circuit for controlling the wireless communication hub in response to a feedback signal received at the feedback port to alter an aspect of the hub in response thereto.

In accordance with yet another aspect of the invention, there is provided a communication architecture comprising:

a plurality of similar overlapping rosettes each rosette defined by radiation from an antenna hub comprising at least 4 directional radiators for radiating power at frequencies associated with a microcell forming a portion less than the whole of the rosette, the rosette comprising:

a number of microcells greater than 3, adjacent microcells within a same rosette associated with different radiated frequencies;

the hub comprising:

a messaging circuit for generating a radio frequency management message indicating data relating to a hub in which the messaging circuit is disposed;

a receiver for receiving radio frequency management messages during use;

a processor for processing the radio frequency management messages to determine a configuration for the rosette that is unlikely to interfere with existing rosettes already in operation; and a control circuit for changing characteristics of the microcells within the rosette for limiting inter-rosette interference.

In accordance with yet another aspect of the invention, there is provided a method of arranging a plurality of overlapping rosettes, each rosette defined by radiation from an antenna hub comprising a plurality of directional radiators for radiating power at frequencies associated with a microcell forming a portion of the rosette less than the whole, the rosette comprising:

a number of microcells, adjacent microcells within a same rosette associated with different radiated frequencies;

the method comprising the steps of:

receiving a radio frequency management signal from at least another hub, the radio frequency management signal including information on the location and transmission characteristics of the at least another hub;

processing the received radio frequency management signal to determine characteristics of the hub that are unlikely to substantially interfere with the at least another hub; and tuning the hub to reduce a potential of interference.

In accordance with yet another aspect of the invention, there is provided a method of supporting hierarchical wireless communications within a same wireless communication environment comprising the steps of:

providing a plurality of overlapping rosettes, each rosette defined by radiation from an antenna hub comprising a plurality of directional radiators for radiating power at frequencies associated with a microcell forming a portion of the rosette less than the whole, the rosette comprising a number of microcells, adjacent microcells within a same rosette associated with different radiated frequencies;

the method comprising the steps of:

detecting a radio frequency signal that other than originates from the hub;

classifying the received radio frequency signal to identify a source thereof;

determining a hierarchy of the received radio frequency signal relative to the rosette; and, when the determined hierarchy is higher than that of the hub, preventing hub transmissions from interfering with the received radio frequency signal, In accordance with yet another aspect of the invention, there is provided a communication architecture comprising:

a plurality of similar overlapping rosettes each rosette defined by radiation from an antenna hub comprising at least 8 directional radiators for radiating power at frequencies associated with a microcell forming a portion less than the whole of the rosette, the rosette comprising:

a number of microcells greater than 7, adjacent microcells within a same rosette associated with different radiated frequencies, some microcells within the rosette associated with same frequencies and spatially isolated from microcells associated with a same frequency, wherein the at least 8 radiators are for radiating signals having sufficiently low sidelobes to provide said spatial isolation, radiators associated with adjacent microcells for radiating at different frequencies such that the adjacent microcells are frequency isolated;

a detector within each rosette for detecting interference with signals other than those transmitted by a hub of the architecture;

a processor for classifying the interference to determine a source thereof and, when the source has a higher priority than the hub, for providing a feedback signal relating to the detected interference; and, a control circuit for changing a characteristic of the rosette for limiting the detected interference.

In accordance with yet another aspect of the invention, there is provided a method of supporting wireless communications within a same wireless communication environment comprising the steps of:

providing a plurality of overlapping rosettes, each rosette defined by radiation from an antenna hub comprising a plurality of directional radiators for radiating power at frequencies associated with a microcell forming a portion of the rosette less than the whole, the rosette comprising a number of microcells, adjacent microcells within a same rosette associated with different radiated frequencies;

the method comprising the steps of:

detecting a radio frequency management signal originating from a similar hub and containing data relating to the similar hub encoded therein;

determining a set of hub characteristics for reducing inter hub interference based on the detected radio frequency management signal;

providing the determined characteristics to a control circuit; and, setting hub characteristics in accordance with the determined characteristics.

There are significant advantages to wireless systems operating at lower than 28 GHz frequencies and preferably in the range of 2–7 GHz. First, the electronics for driving the system is less costly since semiconductor devices operating at lower frequencies are currently cheaper and plentiful. Second, the attenuation due to rain and other obstacles is reduced Third, the antennas are physically smaller and are easily designed having high directivity and low sidelobe levels.

BRIEF DESCRIPTION OF THE DRAWINGS

The invention will now be described with reference to the attached drawings in which:

FIG. 2b is a simplified diagram of limited frequency reuse within known cellular systems wherein frequency reuse occurs by using two frequency ranges within a single cell and arranging cells according to FIG. 2a;

FIG. 5b is a graph of the PDF for co-channel interference within a rosette as shown in FIG. 5a;

FIG. 15 shows simulation results for when EIRP of a second hub is varied;

FIG. 22 illustrates capacity efficiency for different modulation techniques;

DETAILED DESCRIPTION OF THE INVENTION

The present invention presents a wireless communication architecture allowing significant frequency reuse while mitigating the deleterious effects of radio propagation and systemic self interference. Further, the carrier to interference levels (C/I) are limited to improve system performance. This is achieved by dynamic monitoring of the propagation environment, by dynamically assigning frequency bands, and by controlling the radiated power of all terminals.

In most wireless systems using fixed beam antennas, an effort is made to mitigate co-channel interference. The degree to which such interference is reduced determines the information carrying capacity of the contiguous wireless network deployed over a service area.

Figure 1A:
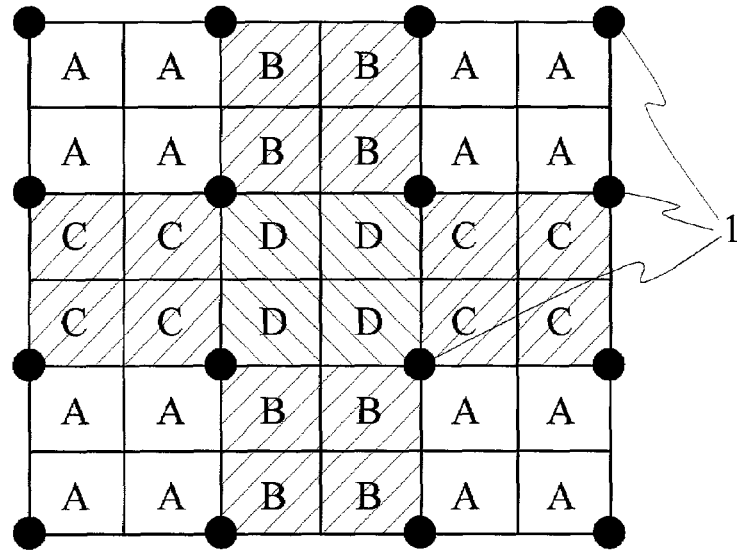
FIG. 1a is a simplified diagram of a plurality of sectorised overlapping LMDS cells, sectorisation supported by frequency allocation within each sector using different frequencies in each sector according to prior art proposals.
Figure 1B:
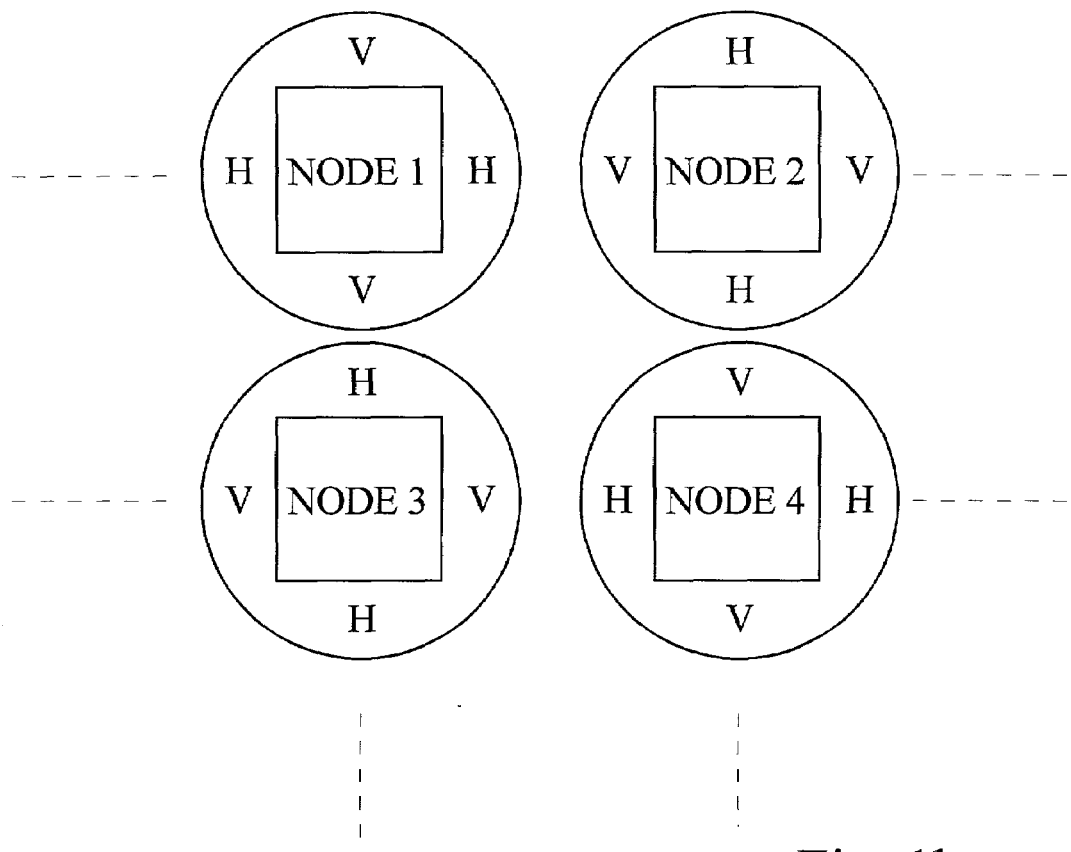
FIG. 1b is a simplified diagram of a plurality of sectorised overlapping LMDS cells, sectorisation supported by polarisation allocation within each sector according to other prior art proposals.

Frequency re-use and co-channel interference reduction is undertaken with LMDS systems. Referring to FIGS. 1a and 1b, two proposed LMDS systems are shown applying sectorisation. In FIG. 1a, a central antenna 1 is disposed within a circular transmission area. The antenna comprises four sectorial transmitters operating at different frequencies with each sector operating with a different frequency. Directional receivers are installed at client sites to receive the signal from an associated transmitter. The receivers are positioned to receive a signal from a particular transmitter having a clear signal at the receiver location. Because there is no frequency reuse, the total bandwidth of such a system is no better than a same frequency use in all four sectors. With a same frequency used in each cell.

Figure 2A:
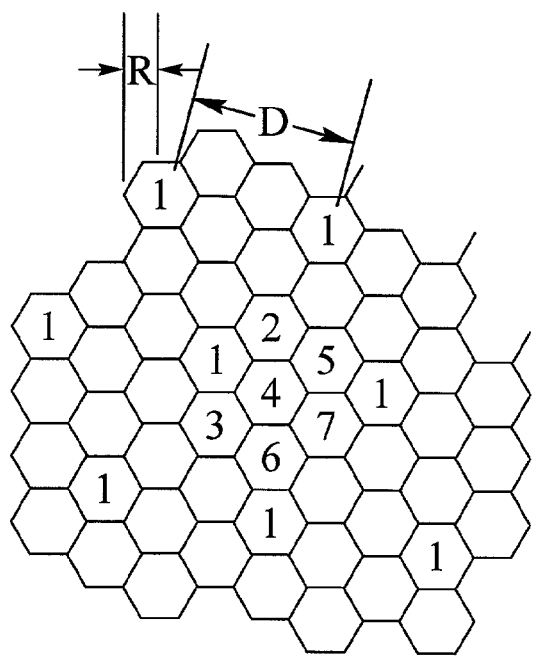
FIG. 2a is a simplified diagram of limited frequency reuse within a known cellular system according to the prior art and showing frequency reuse of a single frequency every eighth cell.

In FIG. 1b, the antenna comprises four sectorial transmitters operating at a same frequency with adjacent sectors operating with different polarisations. Directional receivers are installed at client sites to receive the signal from an associated transmitter. The receivers are positioned to receive a signal from a particular transmitter having a clear signal at the receiver location. Because of polarisation usage, each cell has twice the bandwidth of other LMCS cells Frequency re-use and co-channel interference mitigation is also carried out in cellular and PCS telephony systems. Modeling the coverage areas of a cellular system as hexagons, as shown in FIG. 2a, like frequency hexagonal cells are separated by a distance D that is substantially greater than the nominal radius (R) of the hexagonal cell. Frequency re-use is thus achieved over the contiguous coverage area and co-channel interference is mitigated by counting on the propagation path loss between cells of like frequency to be sufficiently high as to result in significant attenuation of co-channel signals and isolation of cells.

Figure 2B:
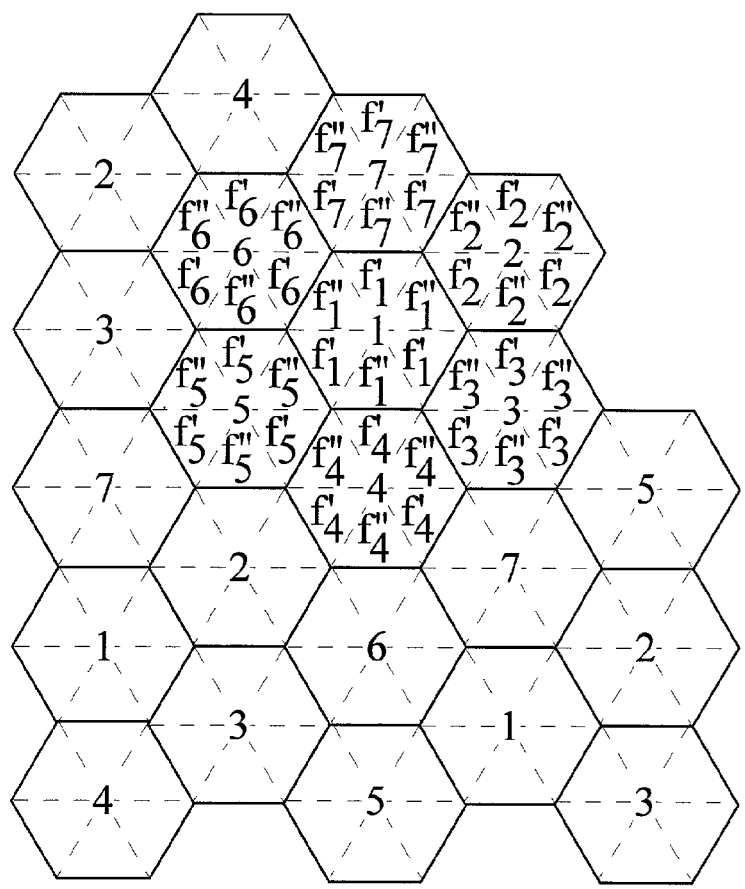

In other embodiments of the cellular and PCS telephony systems, the same frequencies are used in a single hexagonal cell, as shown in FIG. 2b. In this embodiment the like frequencies are re-used 3 times per hexagonal cell as shown, for instance, by the re-use of ($f_2$) in cell number 2. Co-channel interference is mitigated by two process here; firstly by the sectorial isolation achieved by using sectorizing antennas and secondly, by spacing cells containing like-frequencies by the cell spacing D described above.

In each instance shown in FIGS. 2a and 2b, each hexagonal cell has $\frac{1}{3}^{th}$ the bandwidth of the entire frequency range.

Information carrying capacity as a function of cell radius and coverage area is an issue with LMDS systems. This also relates to the frequency re-use considerations. First, the size of the area serviced by a single frequency range in an LMDS system is large and therefore bandwidth to each individual client is limited. Further, when two channels are used in accordance with standard LMDS frequency re-use practices (as shown for instance in FIG. 2b), the LMDS bandwidth of approximately 1 GHz results in each sector having approximately 500 MHz of bandwidth. With four quadrants, a total of 2 GHz of bandwidth is supported in a single circular area. In essence, over 1000 T1 line equivalents can be supported within each cell, assuming 1 Bit/S/Hz efficiencies in the modem technology.

In practical terms this means that with 80,000 homes in the coverage area of a 4 Km radius LMDS cell, an overall bandwidth of 2 GHz results in an average available bandwidth of 25,000 bits/sec per home. There are some drawbacks to this scenario. It is impossible, for instance, to dynamically allocate bandwidth when a quadrant has more usage than a neighbouring quadrant, even when a client is able to receive signals from the transmitters associated with each quadrant, because in order to do this, the receiver needs to be physically moved and/or the antenna polarization must be changed. As a consequence there is the possibility, because of the broad sectorization, of not being able to dynamically assign information carrying capacity as needed. To do so would involve installation of a more complex and dynamic interference monitoring system to oversee the operation of the contiguous network, and would require dynamic reporting of interference by the client terminals.

The issue of terminal complexity is already exacerbated by the high cost of the 28 GHz component technology present in LMDS terminals. Large radii LMDS systems furthermore, require higher dynamic range and higher power amplifiers further increasing cost. Lowering the power amplifier output has the commensurate effect of lowering the information rate of the link. This becomes an issue, especially in the return link from the client when it is desirable to have high return link capacity, as would be the case for a client have a transmitting video server or providing internet service connectivity to other clients.

It has now been found that a plurality of low cost hubs each for communicating with a substantially smaller area and each supporting frequency reuse provides a more effective broadband communication network. Use of radio frequency technology operating in the 3–7 GHz range and preferably in the 5.2/5.8 GHz range is low cost, and will most likely remain so in comparison to 28 GHz technologies simply because of the issues of ease of volume manufacturing and availability of more diverse semiconductor technologies. Smaller service areas entail shorter path distances thereby allowing the use of lower power RF amplifiers. For those desiring high capacity return links, increasing return link amplifier output power and dynamic range is easily achievable with this invention.

It is evident to those of skill in the art that increasing frequency reuse results in increased overall bandwidth and the attendant problems of co-channel interference However, it has been found that the co-channel interference can be controlled by the physical orientation of an antenna and a rosette according to the invention, and furthermore, by applying technology capable of universal addressing and control of both client and hub terminals by TCP/IP and other standard IP protocols, a wide ranging and dynamically effective modicum of system control are exercisable limiting co-channel interference. Furthermore, because of the non-reliance on polarization discrimination as with LMDS, and because of the overlap of non-alike oblong microcells of this invention, it is possible to dynamically assign and re-assign capacity. This latter facility also is very useful in contending with strong, singular multipath interferes that arise in wireless systems; ie a modicum of frequency and angular diversity becomes available to the client terminals with this invention Referring to FIG. 3, two circular transmission areas in the form of cells according to the invention are shown. A single cell 9 is broken into a number of oblong microcells 8. The microcells 8 are also referred to as picocells and petals. Preferably, each oblong microcell 8 overlaps its neighbouring microcells. Microcells are assigned different frequencies with possible reuse of frequencies within a single cell. Because of the appearance of the microcells, petals, within a cell, the architecture of a cell is referred to, herein, as a rosette. Preferably, overlap of microcells is substantial such that a majority of subscribers receive signals from two or more microcell transmitters.

Figure 4:
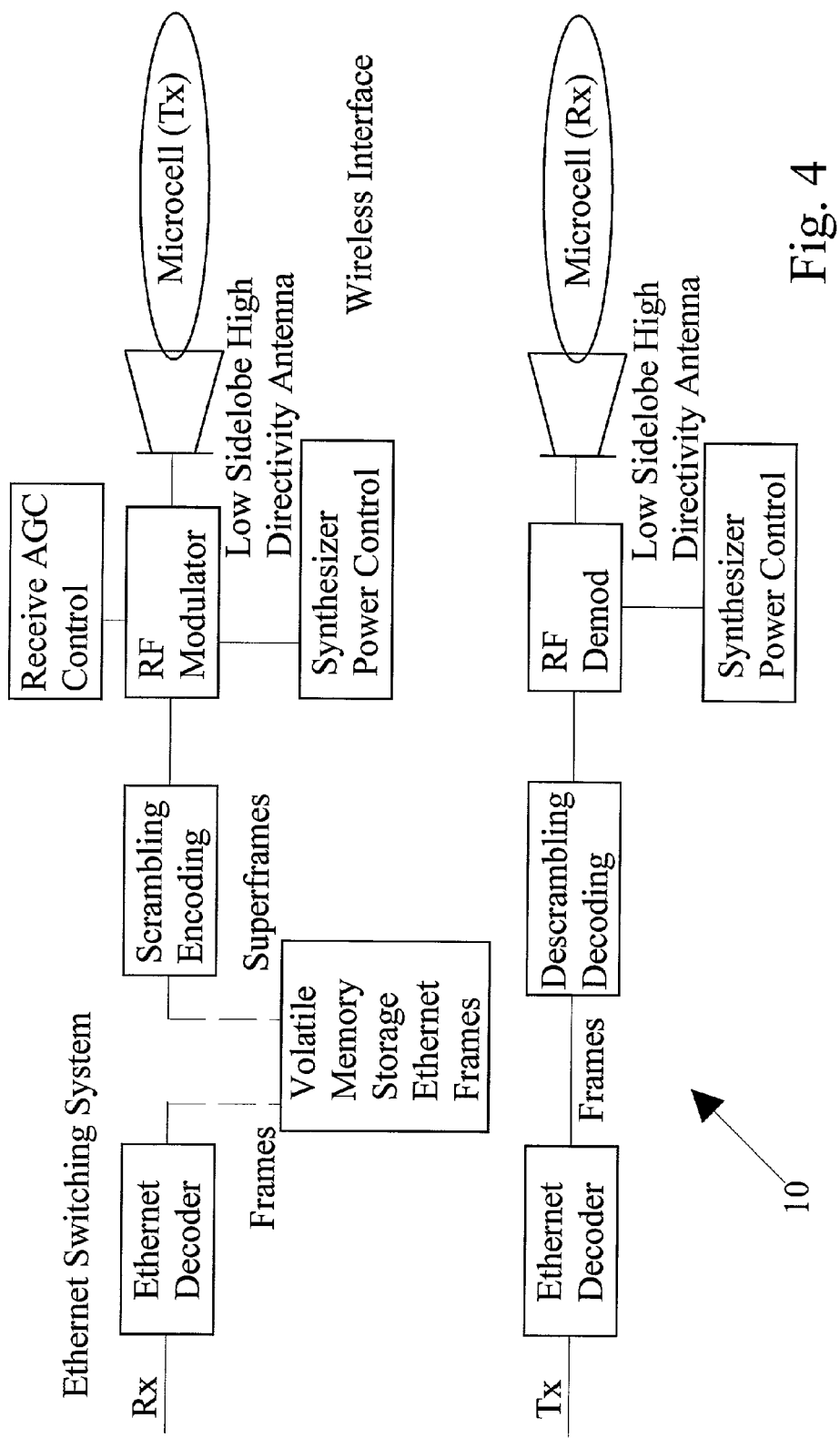
FIG. 4 is a transmitter according to the invention.

The centre of the rosette 9 contains a hub system 10 comprising a transceiver shown in more detail in FIG. 4. In the hub system 10, RF wireless signals are converted to digital data and routed by a Carrier Sense Multiple Access System (CSMA) to and from individual microcells 8. Data is sent from one rosette 9 to another rosette 9 via dedicated interconnecting links based on any of fibre optic communication, dedicated microwave wireless communication, point-to-point atmospheric laser communication, and wireline communication techniques. One of skill in the art will know criteria for selecting a point to point communication method for use between cell hubs. As a result, it is possible to route data generated by a subscriber in one microcell 8 within a cell 9 to another subscriber in a microcell 8 of another cell 9. This is particularly useful for supporting communication media such as telephones, video conferencing, and Internet communications. The system accommodates non-wireless subscribers that are connected to the network via the CSMA system either at the hub or along the inter-rosette link. Optionally, non-wireless subscribers gain access to the system using Ethernet, TCP/IP, a modem or another communication system.

Figure 3:
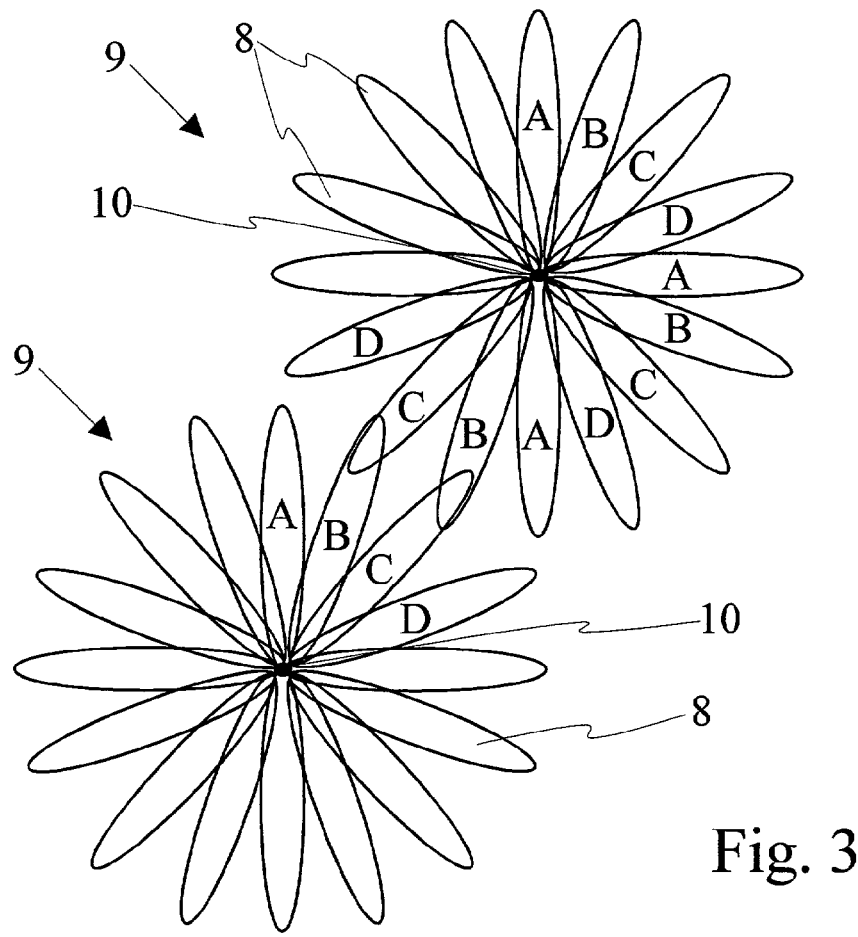
FIG. 3 is a simplified diagram of a plurality of cells each comprising 16 oblong microcells according to the invention and showing frequency channel reuse.

Typically, the physical configuration of each rosette 9 is a same configuration, as is the electronic system that defines the hub 10 and its antenna. Of course, using a same physical configuration and Hub allows employment of economies of scale in hub production and facilitates maintenance, upgrading, use, installation, and technical support of the system. In practice, rosettes are placed over a coverage area in such a manner that microcells containing like-frequencies do not align with each other or illuminate a same coverage area. The microcells 8 in FIG. 3 are assigned a channel—frequency range—from 4 available frequency ranges A, B, C, and D. When the radiators have sufficiently small sidelobe levels by spacing the microcells that are within channel A by at least three other microcells, overlap between radiated signals is substantially eliminated. Consequently, it is possible to electromagnetically isolate signals of like frequency microcells. Isolation is further enhanced by having subscribers to the system use highly directional antennas having narrow beam widths. Preferably, antennas having a beamwidth of 7.5–15 degrees at −3dB power contour are used. Preferably side lobe levels are less than −35 dB at more than 45 degrees azimuth with respect to a peak for a rosette having 32 microcells with 4 frequency bands each reused 8 times.

It is, therefore, possible to reuse frequency ranges within a single cell and to reuse a same frequency pattern in adjacent cells. Frequency reuse is shown in FIG. 3 with frequencies repeating within each quadrant of the cell 9. Thus, each frequency is reused four times. This provides sufficient isolation between cells of a same frequency range while supporting substantial overlap between adjacent microcells. Each microcell operates independently of all other microcells so that clients within a microcell are provided two way communication with the antenna in the hub 10. Of course, because of microcell overlap, a single client often has a choice between two or even three different microcells. This is more significant at distances further from the Hub where signal attenuation is a greater concern.

Though the diagram of FIG. 3 shows 16 petals in each rosette, it is preferred that a single rosette 9 comprise 32 or 48 petals. Four frequency channels are still generally sufficient. This allows for substantial frequency reuse and considerable flexibility. It allows sufficient flexibility in orienting adjacent cells to minimize interference. It also results in an amount of microcell overlap that is advantageous as set out hereinbelow.

Rosettes do not have to have a same transmission range; alternatively stated, cells can vary in size. Typically, large rosettes are used in areas where subscriber density is low whilst rosettes having smaller radii are disposed in areas where subscriber density is high. Isolation between microcells is predicated on the propagation environment. Because of the high degree of frequency reuse within the system according to the invention, it is important to ensure that the co-channel interference experienced by a subscriber is kept at or below such a level that a useable Signal to Noise plus Interference ratio is maintained at both the subscriber and hub ends of the communication link. In order to do this a number of system level design considerations are followed, which are listed below.

A lower power frequency band is used for communication with users close to the rosette hub or not substantially affected by propagation losses. The lower power band allows the use of lower power amplifiers for equivalent radius cells. The lower frequency allows the use of lower power amplifiers for equivalent radii of cells. Higher power bands are provided for users more distant from the hub or those who are substantially affected by propagation losses. Thus each microcell is effectively divided into a near-in microcell and a far-away microcell.

Effective isotropic radiated power (EIRP) Quantification: Subscribers within a rosette are assigned frequencies hating specific EIRPs. Like frequencies in microcells of a same rosette are assigned the same EIRPs. For even, rosette and its microcells, the EIRP assignments span the difference in EIRP between low and high power bands typically span the difference in EIRP between near-in and far-away subscribers, which are respectively close to the hub or on the periphery of the cell's coverage area. The far-away EIRP is typically the highest EIRP allowed by licensing regulations and in essence, defines the extent of the rosette.

Dynamic Propagation and Interference Environment Monitoring: Every subscriber terminal has the facility to monitor the signal environment and report back to a system controller the level and source of detected interference. Every microcell of a rosette contains a unique identifier in its downlink data stream. Every subscriber also has a unique identifier that is detected and decoded by the hub. As part of this monitoring system, the subscriber terminal reports to the system controller the EIRP Quantification requirement data so that it is assigned an appropriate downlink data channel. Further, such a monitoring and feedback system allows for dynamic assignment of a receiver of a particular subscriber to one of the antennas within the hub that transmits to the area where the receiver is located. Thus, because of overlapping adjacent microcells, selection of a microcell from a plurality of available microcells is possible. This allows for system redundancy in case of failure, environmental changes and so forth. It also supports load balancing between adjacent microcells because subscribers at an edge of a microcell, or more accurately stated an area within two adjacent microcells, are optionally served by the channels within that microcell or within an adjacent microcell.

Each microcell contains a number of high capacity, wideband RF data channels. These channels use a modulation technique that is robust in face of multipath and co-channel interference. Typically QPSK is employed. Each channel has a connection to the CSMA data hub, typically built to the IEEE 802.3 standard and called "Ethernet."

Data Processing and Delivery

Referring to FIG. 4, a simplified block diagram of a transmit antenna and a receive antenna for use in the hub 10 is shown. A wide area network in the form of an Ethernet network is in communication with an antenna driving circuit. Frames are received and buffered in volatile memory. Once complete, the frames are provided as superframes to a scrambling encoding processor for encoding. From the scrambling encoding processor, the data is provided to an RF modulator for modulating the data within the frequency range of the microcell. The RF modulator modulates the data and provides a modulated signal to the antenna,. The antenna is for radiating a signal that is highly directional and has low sidelobes. From the antenna is radiated a signal forming the microcell transmission signal.

Since the system supports bidirectional communication, the receiver block diagram is also shown. A receive antenna receives an RF signal from a client. The signal is demodulated to extract the signal data and the data is decoded by a descrambling decoding processor. The data is then arranged in frames and provided to an Ethernet encoder for transmission via the Ethernet. This same block diagram applies to individual subscriber antennas as well. In this fashion, the subscriber appears to be connected via a LAN to the hub and the hub appears connected via the LAN to other hubs. The resulting network acts as if locally installed even though it may span many kilometers.

In use, Ethernet data frames identified as being for a remote wireless subscriber are identified, accepted by an Ethernet interface, and organised into microcells based on the subscriber location. Frames of data are labeled and stored in a temporary volatile memory. At instances these frames arc retrieved en masse and assembled into large superframes, which typically not only contain the Ethernet information frames but also frames of data identifying the microcell and giving other system level information.

Super frames of data are then scrambled, encoded, and encoded with synchronization bytes. The data is then modulated and sent out on the RF channel. At the subscriber terminal, all data transmitted is demodulated and decoded. Data identified for the subscriber is retrieved, segmented as the original Ethernet frames and provided to the subscriber Ethernet interface as such. From the interface, the data is provided to the subscriber CPU. System level information is also decoded and provided to the CPU and specifically, to that application program running on the CPU that controls the subscriber terminal.

On the return link to the hub there are a number of techniques that mediate the flow of data from all of the subscribers registered on a channel. Receiving lower bandwidth data from subscribers at the hub, identifying the data and performing actions accordingly is well known in the art of communications and is not detailed herein. For the purpose of the present description, it is assumed that the subscriber data is packaged as Ethernet frames, and encoded, synchronized, and modulated in much the same manner as the down link data. Of course, it is evident that this need not be so.

Hub and Subscriber Antenna Characteristics

An important design issue to the system is the antenna used at both the subscriber and hub end. According to the present embodiment and because of the significant frequency reuse in the system it is important that antennas used in the system reject interference, It has been found that a level of co-channel interference experienced overall is directly related to the side lobe levels of antennas used in the system.

The antennas, other than having low side lobe levels are designed with narrow, highly collimated beams. Multipath delay spread is a problem in high-speed wireless delivery systems and one way to mitigate this problem is to only accept signals having a delay spread no greater than 10% of the bit duration. For rosettes operating over 2 km ranges with 5 Megabit per second data rates, this translates to a beam width of about 8 degrees, after which a steep attenuation in the main lobe is desirable in order to reject multipath.

In accordance with a further embodiment polarised antennas are used and signals having different polarisations are transmitted to, in effect, double the bandwidth of the system. For example, if a rosette comprises 2 frequency ranges and two polarisation states—vertical and horizontal, the result is four frequency ranges each having twice the bandwidth of four separate frequency ranges each having like polarisation covering a same overall frequency range. Therefore, polarisation and other techniques may be employed within a rosette in order to increase bandwidth.

It is preferred that sidelobes from all antennas are limited according to the equation below:

$$\frac{C}{I_0} = |10\log(N-1) + S_L + \alpha_f|$$

wherein $C/I_0$ is a carrier to interference ratio and is a threshold in dB for operation of a demodulator of the modulated signal at a known performance level with $I_0$, the interference noise, substantially greater than thermal noise $N_0$, N is equal to a number of like frequency petals within a rosette, $S_L$ is mean sidelobe level of the radiators at angles greater than $(M-O.5) \times (BW_h)$ away from the free space main lobe of the beam where $BW_h$ is the width of the individual microcell, and $\alpha_f$ is dependent upon the environmental factors associated with scattering of signals as expressed in dB.

When radiators meeting this requirement are used, the receive antennas act to filter out noise and the transmit antennas act to reduce transmitted inter-microcell interference. Therefore, the entire system acts to provide isolation between microcells of same carrier frequencies.

EXAMPLES

The Unlicensed National Information Infrastructure Frequency Allocations from 5.15 GHz to 5.825 GHz were used in a series of experiments conducted in an urban residential and commercial environment characterized by high foliage and roof top/building presence in the signal path. Tests were conducted with rosette petals having 11.25 degrees beamwidths in azimuth and elevation. Furthermore, simulation studies were conducted to examine the behaviour of constellations of rosettes over a contiguous coverage area. The simulations, where possible, used data taken from the experiments.

In both the experiments and simulation studies, frequencies were reused every 45 degrees thus requiring four different frequency ranges each reused 8 times. A parabolic Tx/Rx low sidelobe antenna having −30 dB sidelobes and a gain of 25 dBiC was used at the hub with subscriber antennas having similar characteristics. 200 MHz of spectrum was assigned to the system for the transmit (forward link) direction and 100 MHz was assigned to the return link. Therefore, each petal is assigned 50 MHz of bandwidth in the forward link and 25 MHz in the return link.

Simulations where conducted on the carrying capacity of a 5.2/5.8 GHz rosette system as described and compared to a typical 28 GHz LMDS system. Assuming a cell size of one kilometer in radius, there are approximately 5000 homes within a cell and approximately 160 homes within a petal. Thus the bandwidth to each home during maximum usage (all homes demanding as much bandwidth as possible) is 50/160 MHz or approximately ⅓ megabits/second per home hi the forward direction when using a robust modulation scheme for DVBS/QPSK (ETSI 300 421) generating an information density of 1 bit/sec/Hz. This is substantially more than the 16,000 bits/second for the prior art LMDS system. Since, at any time it is unlikely everyone within a same area is using the communication medium to its fullest, most subscribers will always see a substantially greater amount of bandwidth.

Next, an analysis is presented below for demonstrating the behavior of systemic C/I in a broadband network according to the invention. The analysis considers singular rosettes and constellations of rosettes operating over a large contiguous area.

The primary constraint on spectrum reuse in wireless systems is co-channel interference, Most of the literature studying the channel assignment problem has been aimed at cellular phone systems where the antennas used are either omnidirectional or have provide for sectors within a cell having very wide sectorial beam widths. When a sector is assigned a frequency range or channel, the term frequency sector is used. A reused frequency sector is a repeated frequency assignment or channel within two different Sectors. Reused frequency sectors are typically spaced by a number of cell radii apart as is the case with, for example, 800 and 1900 MHz wireless (cellular and PCS) telephony, and can be reused within a cell as shown in FIGS. 2a and 2b. With LMDS, it is proposed to reuse frequencies in different sectors within a same cell by employing polarization isolation. Otherwise, LMDS makes use of a same frequency sector only once in the cell. Whatever the case, in LMDS the frequency is reused in the next cell as shown in FIGS. 1a and 1b.

The channel assignment problem in rosette systems that utilise highly directive antennas is quite different. The same frequency sectors are used a multiplicity of times in a same cell. Adjacent cells also have exactly the same configuration of directive antennas, microcells, and frequencies, and spacing between adjacent rosettes is often smaller than the rosette radii. In fact, like frequency microcells commonly overlap. Further, the position and the configuration of interlacing of the cells is changed by rotating the microcells with respect to each other, and in so doing, the co-channel interference seen by the subscriber terminals within the cells is also changed.

The high directionality of the microcell and subscriber antennas significantly attenuates the co-channel interference originating from other like-frequency microcells. The degree to which co-channel interference is attenuated is dependent on a number of factors, such as antenna height, average beamwidth and sidelobe level of both the transmitting and receiving antennas, and the propagation environment. This last factor is spatially variable, has a pronounced effect on the C/I that is at the receiving terminal, and ultimately places limits and constraints on narrowness and spatial separation of like frequency microcells in a rosette. Narrowing the beamwidth of a microcell and reducing the angular spacing between like frequency microcells beyond a certain point, for instance, results in no commensurate increase in the frequency reuse factor of a rosette, regardless of the sidelobe level, simply because multipath scattering rises to significantly deleterious levels under such conditions.

Experimentally, it has been found that in 5.2 GHz rosettes operating with a 45 degree spacing between like-frequency 11.25 degree width microcells, scattering degrades the isolation between like-frequency microcells by a nominal, $\alpha_f$, of 8 dB above what is predicted with free-space side-lobe level measurements of the microcell antenna patterns. This factor, $\alpha_f$, is believed to be the aggregate of many multiple reflections and has not been separately identified. They are generated by radiation emanating from the sidelobes as well as the principle lobe of the microcell antenna. It is believed that this factor is strongly dependent on wavelength and polarisation of the frequency and dimensions of the objects situated within the propagation environment.

Additionally, it has been found that the propagation path loss exponent for the environment described above is typically between −2.4 and −3.4; and that it varies both as a function of antenna height and distance separating transmitting and receiving antennas. These findings are based on over 400 detailed measurements taken in highly foliated urban residential environments typical of proposed service areas for the present invention, and are consistent pith other findings in current literature on urban 5.2 GHz propagation and such fields as C and Ku Band satellite communications where antenna side-lobe degradation by multipath scatter is noted.

While it is impossible to quantify the individual sources of the multipath which contributes to $\alpha_f$ it is possible to contend with strong singular reflections that are often present and significantly deleterious because they are at levels within the same order of magnitude as direct and desired microcell signals According to an embodiment, such strong direct scattered signals are monitored by the receiving terminal. Analysis of the signals results in identification of an originating microcell. This function is undertaken by the Systemic Co-Channel Interference Controller (SCIC), which oversees the operation of the rosettes forming a contiguous network. The SCIC is provided with an ability to switch radiation emanating from any microcell on and off, thereby facilitating the sampling and registration of strong interferers by receivers. Problematic radiators that generate strong multipath interference are turned off. Because of substantial overlap between adjacent microcells, the resulting rosette likely maintains coverage of most of the same area. Of course, when two radiators are used for a single microcell, one near-in and one far-away, only the radiator that results in the interference is affected. Alternatively, the terminals being interfered with are assigned interference free channels. For example, addition of a fifth channel for use when substantial interference exists is a possible solution.

Simulation results set out below are based on a rosette configuration with 8 petals per frequency group as shown in FIG. 7. Each beam is 11.25 degrees in azimuth with each subsequent beam offset by 45 degrees. There are in total 4 groups of petals with each group offset from the next. Only one group is shown in FIG. 7.

Both intracellular and intercellular interference are analysed. Only interference from beams using a same frequency is considered. Adjacent channel interference is ignored. Experiments and simulations described below were conducted with the following parameters:

| Parameter | Default value |
| --- | --- |
| Frequency | 5.2 GHz |
| Maximum Cell Radius | 2000 m |
| Subscriber Height | 11 m |
| Tower Height | 25 m |
| Subscriber Up tilt Angle | 0 degrees |
| Tower Antenna Down Tilt Angle | 0 degrees |
| Subscriber Antenna Beamwidth | 11.25 degrees @-3dB Contour |
| Hub Antenna Beamwidth | 11.25 degrees @-3dB Contour |
| Sidelobe Levels (all antennas) | −30 dB |
| Rosette Packing Architecture | Hexagonal |

-continued

| Parameter | Default value |
| --- | --- |
| EIRP | Constant for all hubs |
| Environment: | Propagation Path loss 2.9 +/− 0.5 |

The antenna pattern used in simulation, was $$P_{(\theta,\phi)} = (\sin^m\theta \, \sin^n\phi)$$

where P defines the equal gain contours of the antenna pattern, and the values of m and n are simulation factors adjusted to generate simulated main lobes, resulting in patterns with a3 dB beam width of 11.25 degrees in azimuth (θ) and in elevation (φ). This closely follows that used in experimental and prototype systems. Such a pattern gives a nominal directive gain of 25 dBi. A sidelobe level of −30 dB was used for all angles greater that 30 degrees away from the main lobe. Both subscriber and hub antennas were alike in the simulations and the experimental trials A path loss exponent of 2.5 was used in the simulations. This is in line with experimental results where the path loss for the average terminal has a mean of about 2.9 with a variance of 0.5 for the urban environment A power control strategy was utilised to minimize intracellular interference. The dynamic range of power produces circumferential zones of coverage around the hub. A user in a given zone is provided a transmit tower antenna transmitting enough power to reach the outermost subscriber in the zone. Users of a same channel in a different microcells are then constrained to being in a same zone, and thus at a same, constant EIRP. This power control strategy was used throughout the simulations. It is assumed that each cell is identical in how its dynamic range is divided into power zones and attributed channels to the respective zones. In the 5.15–5.35 GHz frequency plan embodied within the experimental system, typically two zones would arise; a low power zone, near-in, for communications within the immediate area of the hub typically to a radius of 700 meters, given a 25 dBm/MHz EIRP limit, and a high power zone, far-away, for communications to the periphery typically 1500–2000 meters for a 34 dBm/MHz EIRP limit.

Intracellular Interference

Figure 5A:
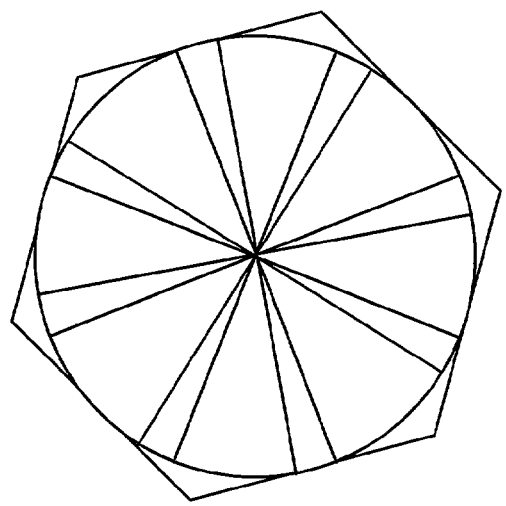
FIG. 5a is a simplified diagram of a single cell design used in simulating results of the application of the invention to a multicell configuration broadband communication network.
Figure 5B:
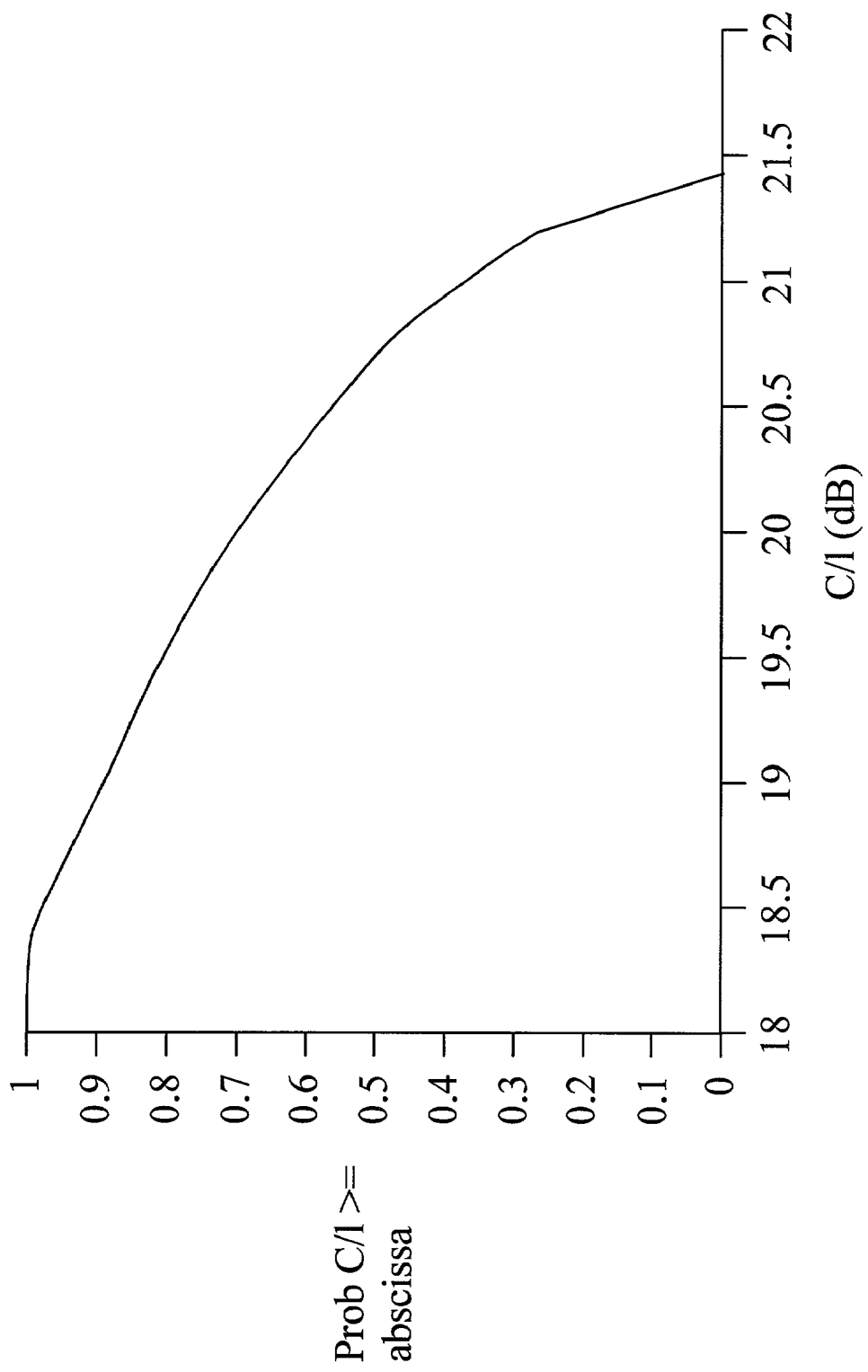

Intracellular Interference is the co-channel interference that a receiver within a designated microcell in a single rosette experiences due to the other like-frequency microcells within a same rosette. A single rosette used in the measurement and simulation is shown in FIG. 5a. The PDF for such interference is shown in FIG. 5b.

The co-channel interference experienced is due solely to the azimuth position of the receiver within the microcell and the sidelobe level. In a case where there is no multipath scattering then:

$$\frac{C}{I_0} = |10\log(N-1) + S_L + \alpha_f|$$

where $S_L$ is the ratio between the received power in the desired microcell and the mean sidelobe level; note that $S_L$ depends on the azimuth position of the receiver with respect to the main lobe; N is the number of like frequency microcells in the rosette; and $\alpha_f$ is the multipath scatter factor, which in ideal circumstances is equal to 0.

Figure 5C:
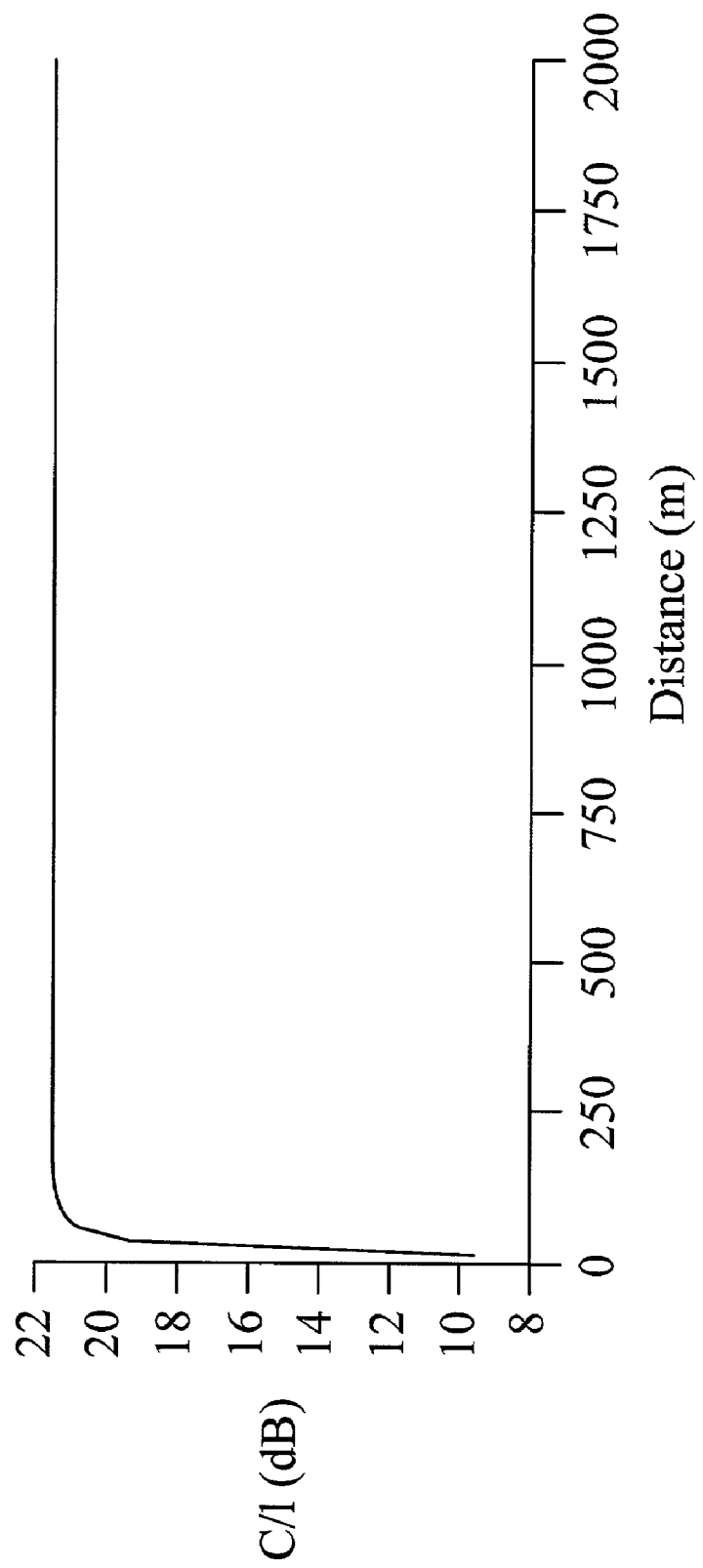
FIG. 5c is a graph showing how C/I within a rosette according to FIG. 5a is invariant with distance away from the hub.
Figure 5D:
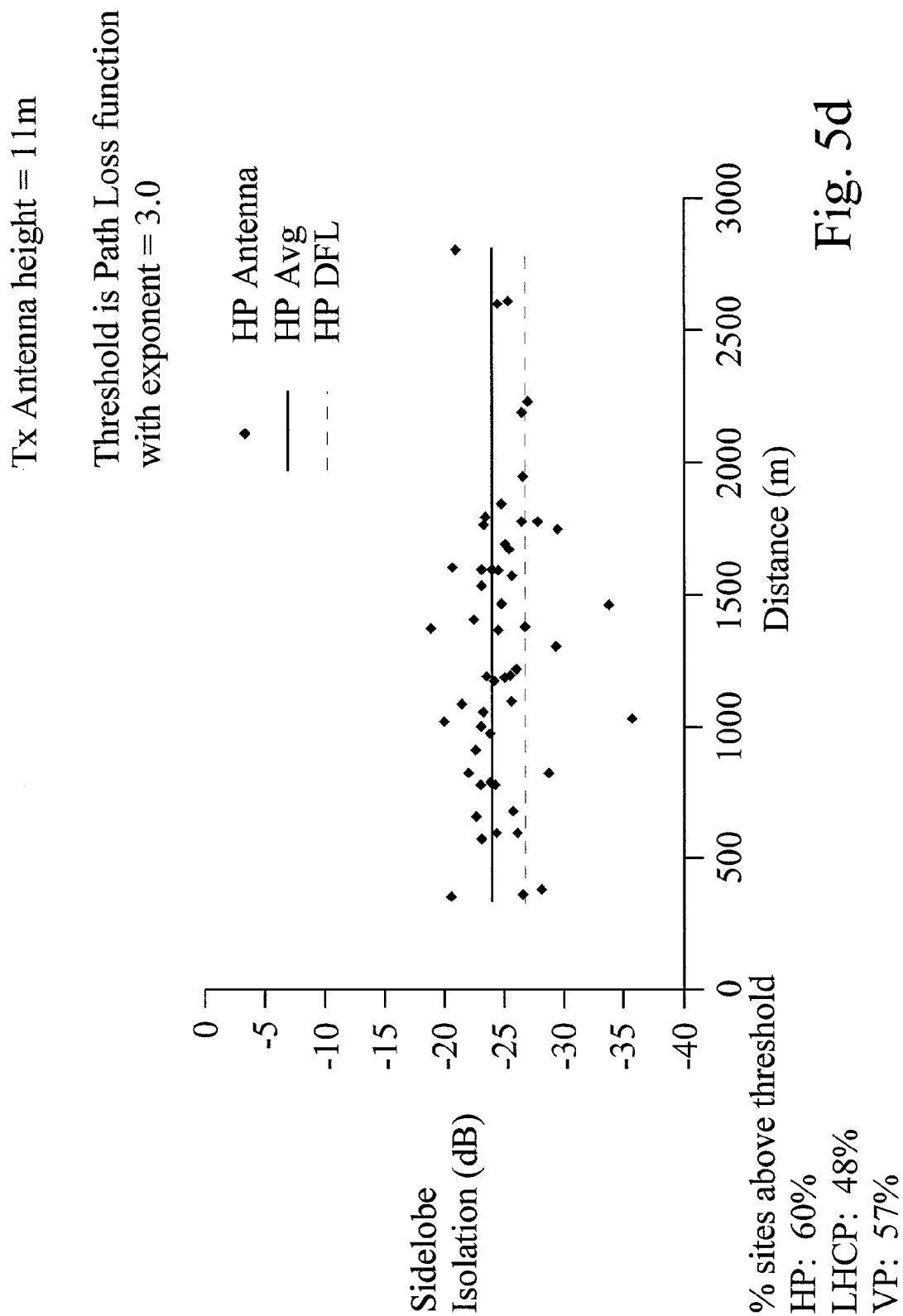
FIG. 5d is a graph showing measurements that were taken in a highly foliated urban environment where the $\alpha_f$ is about 3 dB.

FIG. 5c shows how the C/I under such circumstances is invariant with distance away from the hub. FIG. 5d shows measurements that were taken in a highly foliated urban environment where the $\alpha_f$ is about 3 dB. The measurements also demonstrate the invariance with distance of C/I.

Intercellular Interference

Intercellular interference is the co-channel interference that a receiver within a designated microcell in a single rosette experiences due to the other like-frequency microcells in adjacent rosettes.

Figure 6A:
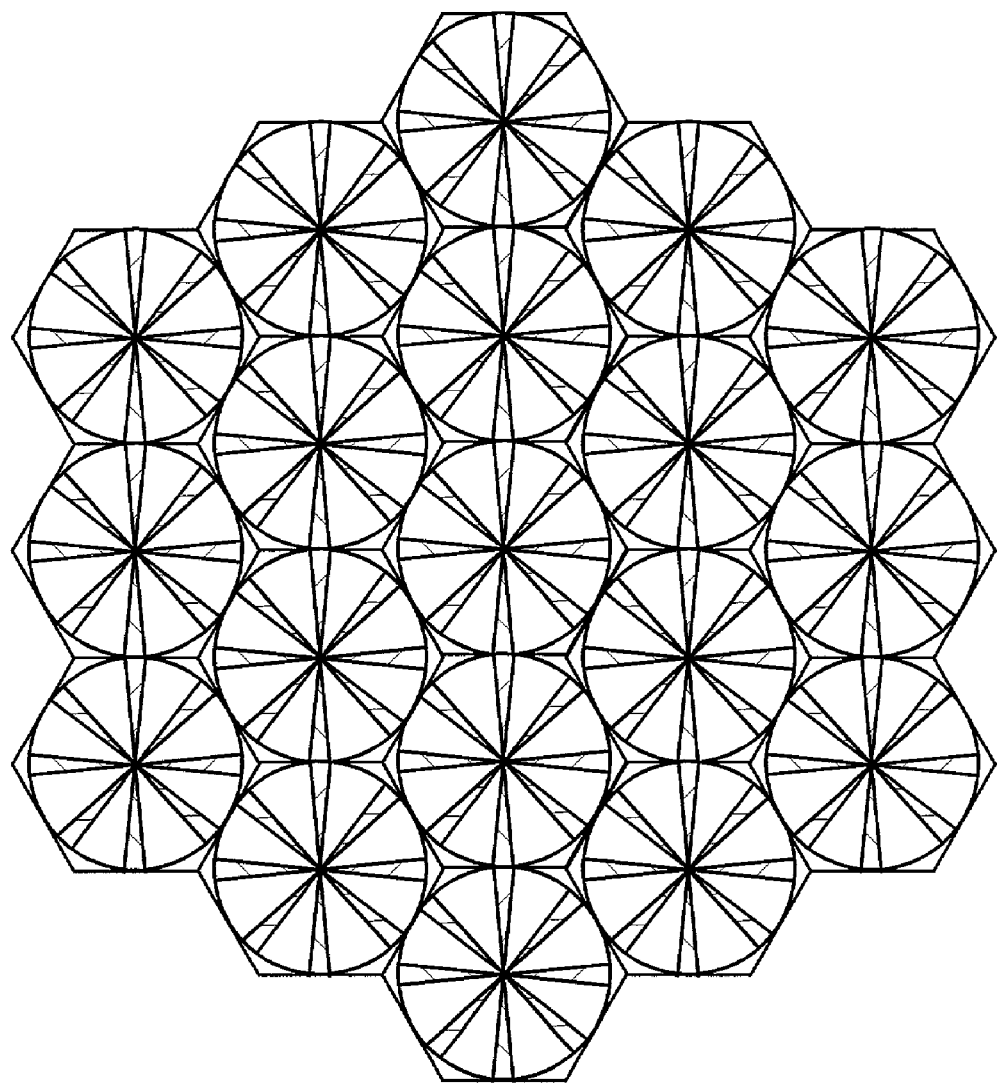
FIG. 6a is a simplified diagram of a constellation of rosettes wherein microcells of like frequency ranges within different rosettes are oriented 180 degrees relative one to another.

In the simulation study, a constellation of 19 rosettes packed into a hexagonal architecture was assumed as shown in FIG. 6a. Interference as seen by a subscriber in a randomly chosen target microcell was calculated; this interference is based on radiated signals simulated based on all other like-frequency microcells in the constellation.

Figure 6B:
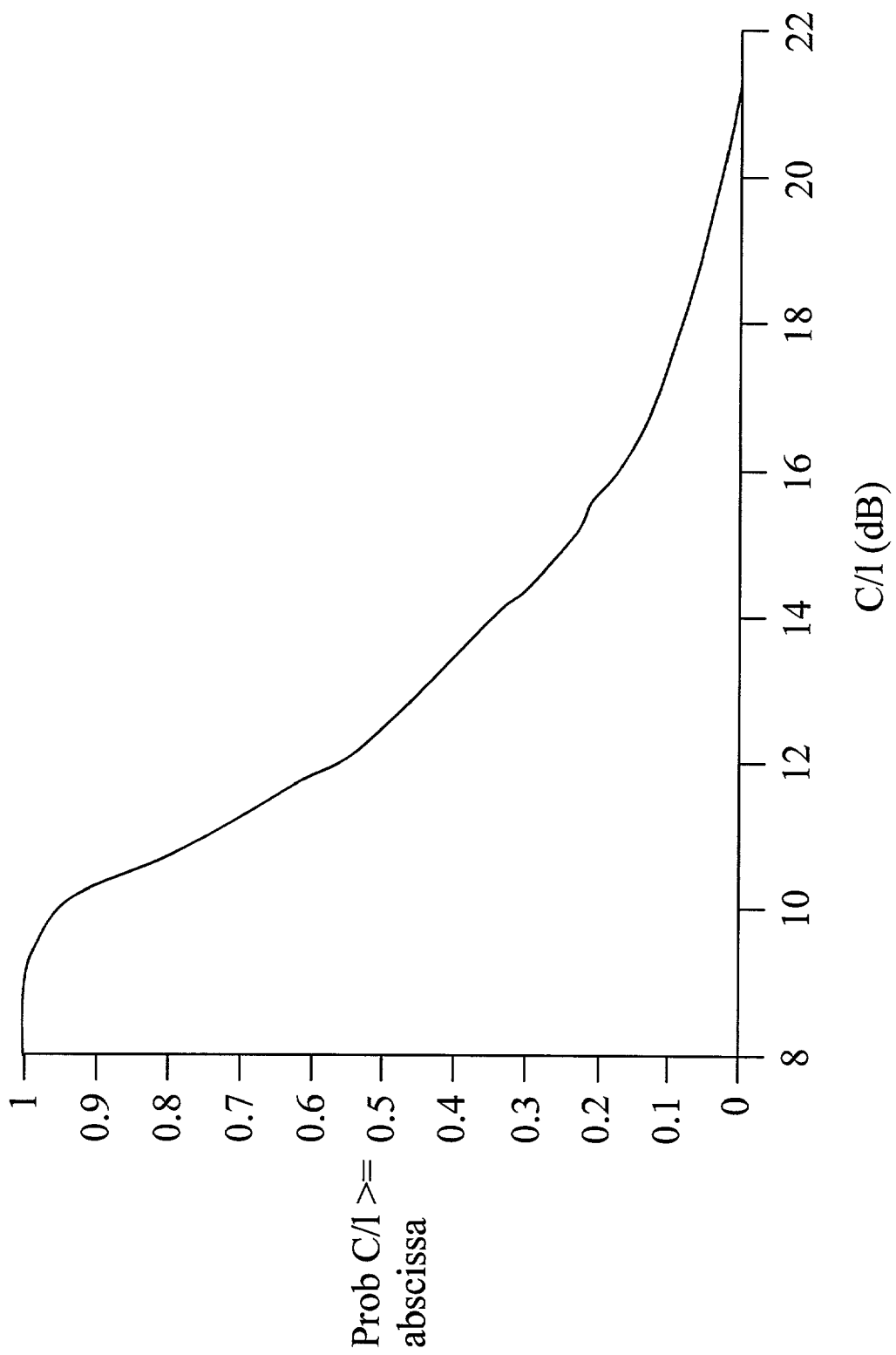
FIG. 6b is a graph of an estimated Probability Distribution Function (PDF) based on C/I calculations showing the probability of achieving a stated C/I in the configuration of FIG. 6a wherein approximately 33% of terminals receive a C/I of 14 dB or better.

In the first case, microcells were aligned as shown in FIG. 6a Typically 4000 random placements of a subscriber were undertaken and the resultant C/I was calculated based on the criteria given above. The resulting data was used to generate a Probability Distribution Function (PDF), which shows the probability of achieving a stated C/I in the given scenario shown in FIG. 6a. The resulting PDF is shown in FIG. 6b. Accordingly, approximately 33% of the terminals in this situation receive a C/I of 14 dB or better; which is close to the threshold of QPSK modem operation.

Figure 6C:
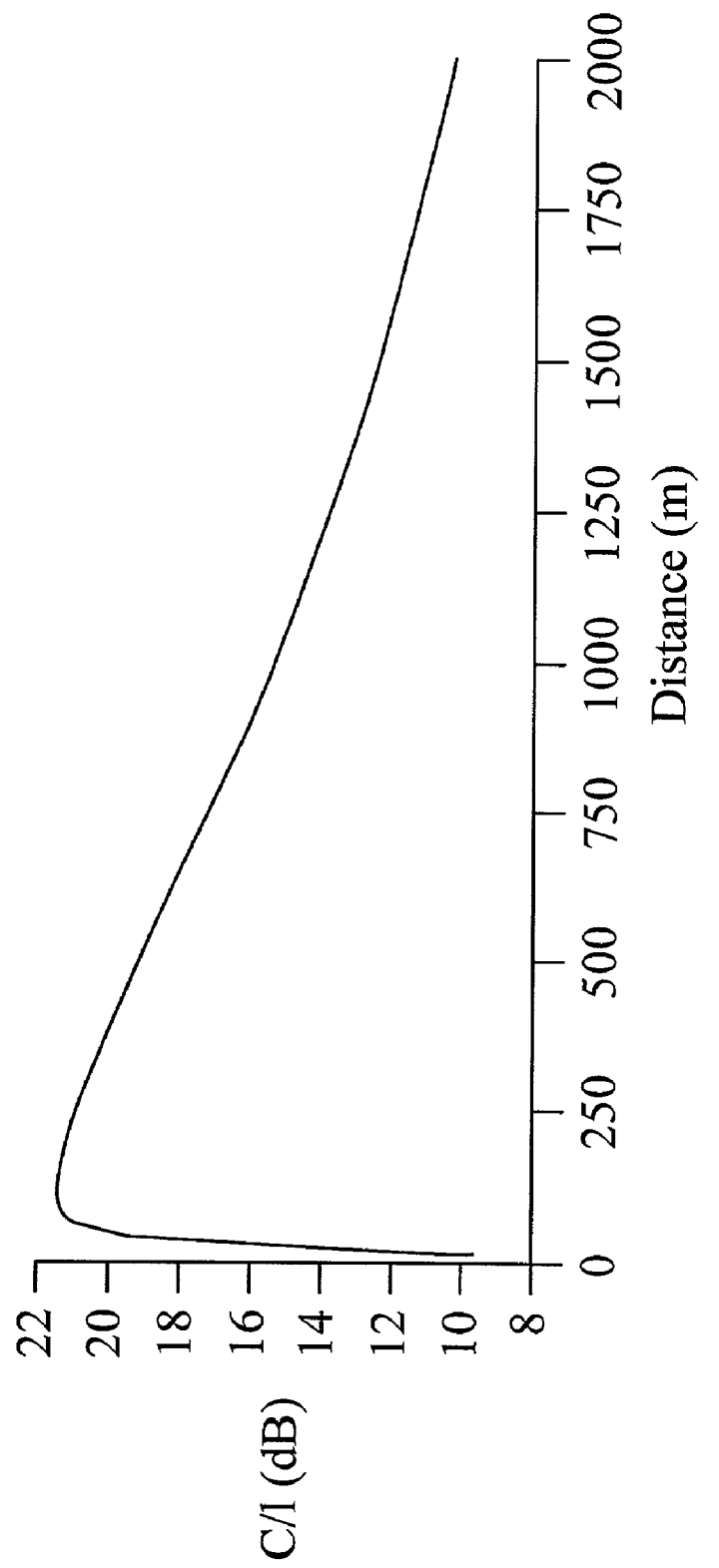
FIG. 6c is a graph of C/I for a typical receiver situated along the boresight axis of the main lobe defining a microcell as a function of radial distance from the rosette centre.

FIG. 6c shows the C/I that a typical receiver situated along the boresight axis of the main lobe defining a microcell would experience as a function of radial distance from the rosette centre. Accordingly, at distances greater than 1200 meters from the hub the C/I of the average user along the centre of the microcell is below 14 dB.

Figure 7A:
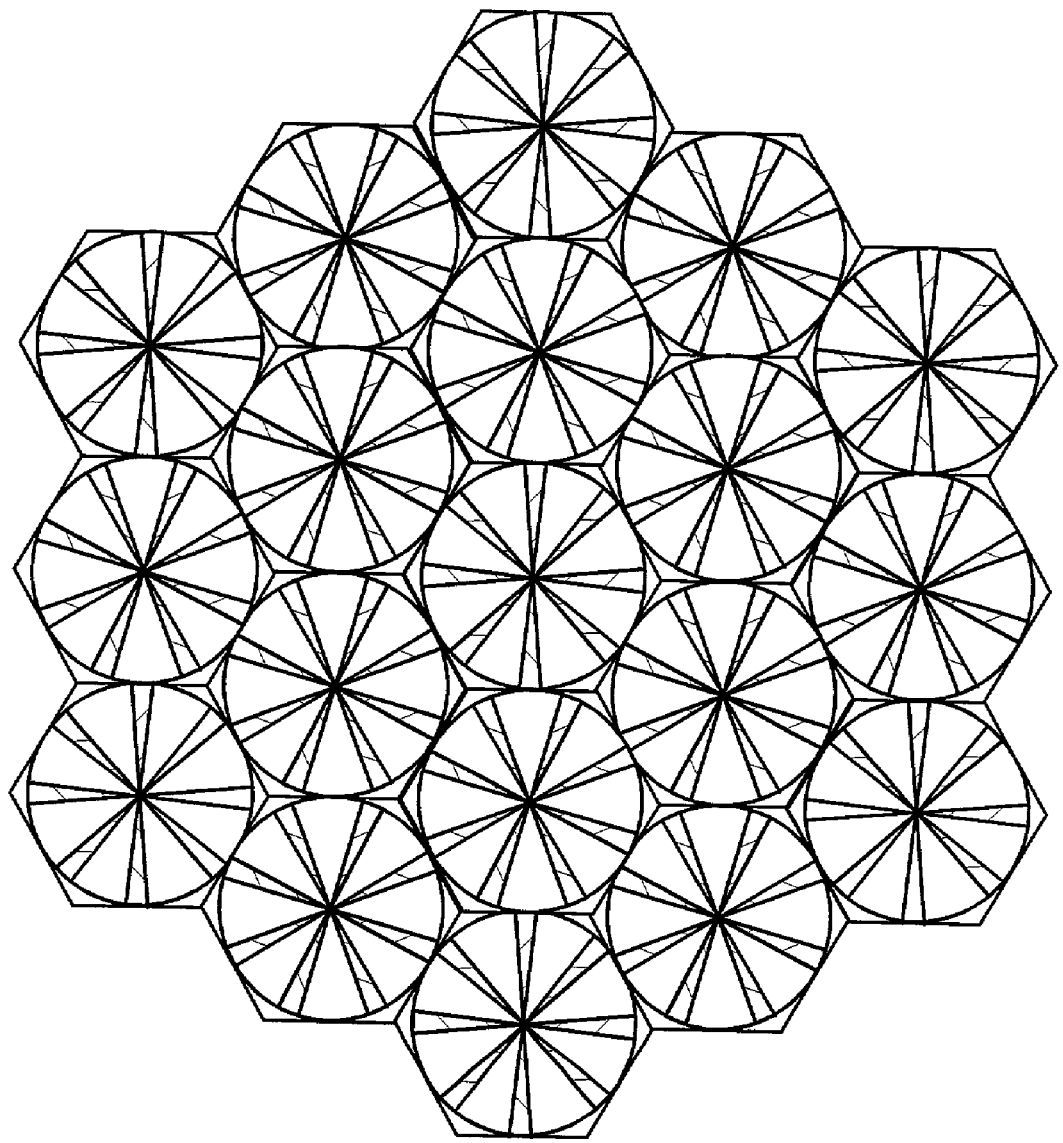
FIG. 7a is a simplified diagram of a constellation of rosettes having irregular offset alignments between microcells within adjacent rosettes and associated with a same channel frequency range.
Figure 7B:
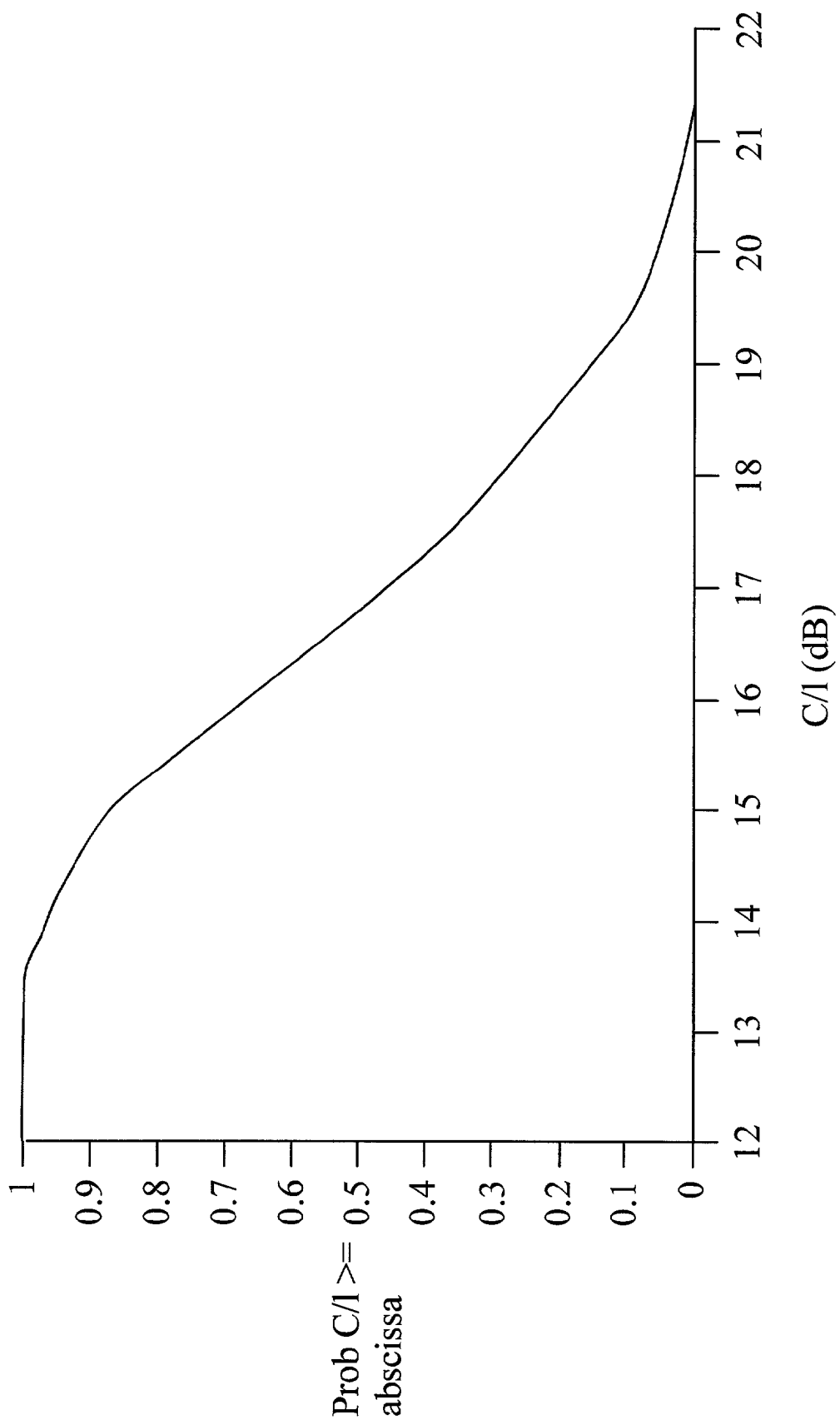
FIG. 7b is a graph of an estimated Probability Distribution Function (PDF) based on C/I calculations showing the probability of achieving a stated C/I in the configuration of FIG. 7a wherein approximately 97% of terminals receive a C/I of 14 dB or better.

The effect of rosette rotation is demonstrated in FIG. 7a, where the rosettes in the 19 element hexagonal constellation are changed in alignment with respect to each other, thereby no longer having regular alignment shown in FIG. 6a The resulting PDF of C/I is shown in FIG. 7b. Accordingly, in this situation with rosette rotation, about 97% of the users experience a C/I of 14 dB and greater.

Figure 7C:
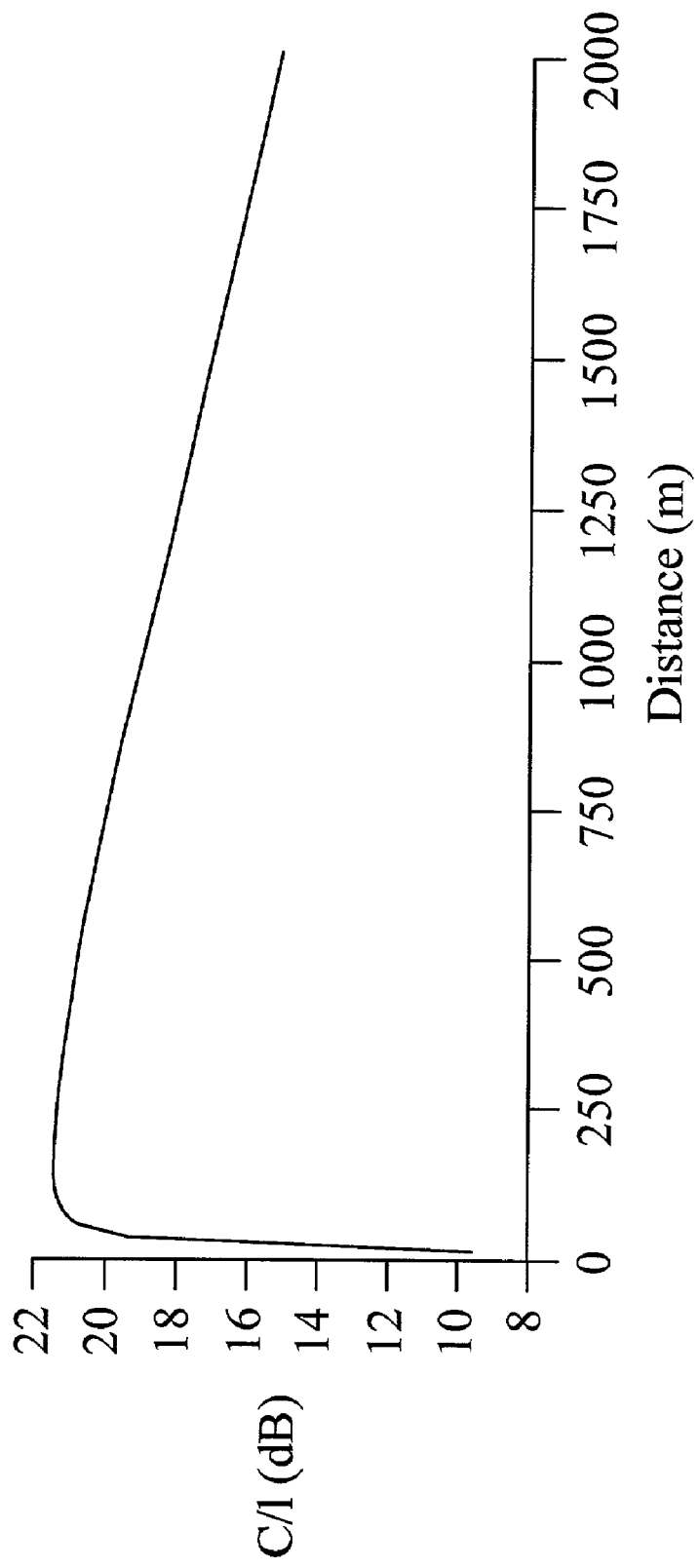
FIG. 7c is a graph of C/I for a typical receiver situated along the boresight axis of the main lobe defining a microcell as a function of radial distance from the rosette.

FIG. 7c shows the C/I that a apical receiver situated along the central axis of a microcell would experience as a function of radial distance from the rosette centre under circumstances of rosette rotation. Accordingly, even at 2000 meters from the hub the C/I of the average user is approximately 15 dB and greater.

These results demonstrate the beneficent effects that rosette rotation and microcell interlacing has on C/I performance, and ultimately, the information carrying capacity of such a highly organized wireless architecture.

Systemic Co-Channel Interference Control

A brief description of the SCIC was given above. The algorithm operates in controlling the overall co-channel interference generated by the microcells and their client subscriber terminals This control is possible because every microcell radio terminal, be it hub or subscriber, has an address in the form of an Internet Protocol (IP) address. Similarly, the means of communicating between the SCIC computer and the rosette network is, for example, via TCP/IP (Transport Control Protocol/Internet Protocol)

The SCIC attempts to maintain a figure of merit for the constellation of rosettes forming a contiguous network. The Mean Systemic Co-channel Interference Ratio (MSCIR) is preferably maintained, and it is the ratio of desired carrier power radiated by a hub of a rosette to a subscriber to the interferening co-channel carrier power generated by emissions from all other like frequency microcells within the rosette and other adjacent rosettes.

The MSCIR is affected by the following functions:
(a) maintaining a specific side lobe suppression level for microcell and subscriber antenna beams;
(b) positioning microcells of adjacent rosettes in such manner that like-frequency zones of illumination are geographically isolated from each other and do not geometrically align;
(c) creating isolation between subscribers and interfering zones of illumination by mechanically or electrically steering subscriber antenna beams away from such zones;
(d) having the subscriber terminal actively monitor the propagation environment and report co-channel interference levels due to interfering signals from other microcells;
(e) adjusting the EIRP's of hub and subscriber terminals.

Rosette Frequency Grouping to Effect the Establishment of a MSCIR

Preferably, a compliment of frequencies divided into N distinct groupings of channels is assigned; each grouping is assigned to a specific microcell and repeatedly assigned to the adjacent N+1; 2N+−1; 3N+1; . . . microcells of the rosette. In this manner the azimuth spacing of like-frequency oblong microcells in a rosette has a maximum possible spacing for a selected frequency reuse ratio. Preferably when the number {M} of oblong microcells per full rosette is a multiple of the number {N}, the number of microcells having exactly the same channel band is equal to (M/N).

The individual channels of a distinct grouping are blocked into sub-groups of fixed EIRP, each sub-group stepped in EIRP with respect to the other. Subscribers are assigned channels only from a sub-group where the EIRP is sufficient to meet the MSCIR requirement. The stepping is of a dynamic range for meeting MSCIR requirements of near-in and far-away subscribers within the microcell.

Data Routing within the Rosette System

In encoding and modulating data within the directional forward link RF signal transmitted from each radiator, any of a number of transmission schemes is useful provided they are robust enough to contend with the vagaries of the propagation environment and the co-channel interference. Typically, a TDM divided stream in which concatenated blocks of data in the stream are identified for specific subscribers resident within a microcell is used. Each frequency range, channel, interfaces with a local area network (LAN) resident within the hub. For example, the LAN is a Carrier Sensed Multiple Access System using Collision Detection typically known as the Ethernet or IEEE802.3 Standard, Data on the Ethernet is received by an electronic subsystem that interfaces with an individual channel of a microcell. The data is received as a standard Ethernet Frame. This frame of data is buffered in a volatile memory, and then buffered frames are retrieved, concatenated with spacing between frames filled with either dummy bits or system specific bits to form super frames. The super frames are then scrambled, Viterbi encoded, Reed-Solomon encoded, and modulated for transmission. Super frames thus created are then TDM slotted and radiated into the microcell on a signal at the channel frequency. One standard that is suitable for this type of forward link data distribution is based on the ETSI (European Technical Standards Institute) 300–421.

This standard also specifies the use of QPSK modulation, which is robust in face of co-channel interference.

A subscriber receives data super frames modulated within an RF frequency within a microcell. The subscriber system demodulates all data contained in the super frames and detects Ethernet frames directed specifically to the subscriber's computer and communication system. Ethernet data frames identified for the subscriber are presented to the subscriber computer as Ethernet Frames on the subscriber LAN. Therefore, each subscriber appears connected to a LAN. Lost or corrupted frames are ignored, leaving it to the higher levels of the serving protocol to either retransmit the lost data in the case of, for example, TCP/IP sessions between the subscriber and network or simply continue the streaming of data in the case, for example, of UDP packet streaming for video services. Each microcell channel is given a unique identifier imbedded in the concatenated forward link bit stream of super frames. Each subscriber transmission is given a unique identifier, which is imbedded in the return link data to the hub. There is a return link channel accessible by all subscribers within a microcell. Access to the channel is in a TDM slotted format, which is prearranged by the hub controller. Requests for access or transmission of short data messages are done on a random access, contention basis within available TDM return link slots Using Ethernet as a wireline access protocol and TDM with reservation and contention slots, it is possible to devise a system that supports efficient bidirectional data transmission over the wireless communication medium within a cell. The resulting communication is applicable to many fields including voice, video and data communication.

A system according to the present invention is suitable for many communication applications. These include Internet service provision, video on demand, interactive television, voice networks, and so forth. Because of the wireless technology employed, there is little installation cost, no cables to run, and very simple, unintrusive user setup procedures. Also, the chances that a communications link will be lost due to digging and so forth are non existent since the system is not based on a physical connection to the subscriber's location. The architecture provides a system that is modular, scalable, and transparent to data or protocols communicated through the architecture. Because of the high bandwidth that is supported, there are many commercial, medical, and educational applications for the technology.

The system envisaged operates in the 5150–5350 MHz bands on the forward link and 5725–5825 MHz bands on the return link, however it can be scaled to any frequency. Operating in these stated bands requires sharing on a co-channel basis of frequencies common to a number of Low Earth Orbiting (LEO) satellite systems, which are prima users of these bands. In these bands, the lower bands are used to transmit signals from a hub while the higher bands are used to transmit signals from subscribers to the hub. This limits interference with satellite bands to those signals emanating from the hubs. To further mitigate interference to the satellites it is necessary to use highly directive antennas, having the characteristics stated above, and orient these antennas below the horizon by 3 degrees so that the −30 dB sidelobes are maintained at elevation angles of 22 degrees above the horizon. Further, the maximum EIRP's in the band 5150–5250 MHz must not exceed 25 dBm/MHz and in the band 5250–5250 it must not exceed 34 dBm(Mhz.

Designing a system using rosettes for wireless transmission of data is dependent upon, power received at an antenna, a path loss exponent, co-channel interference, different modulation techniques and capacity efficiency.

Figure 8:
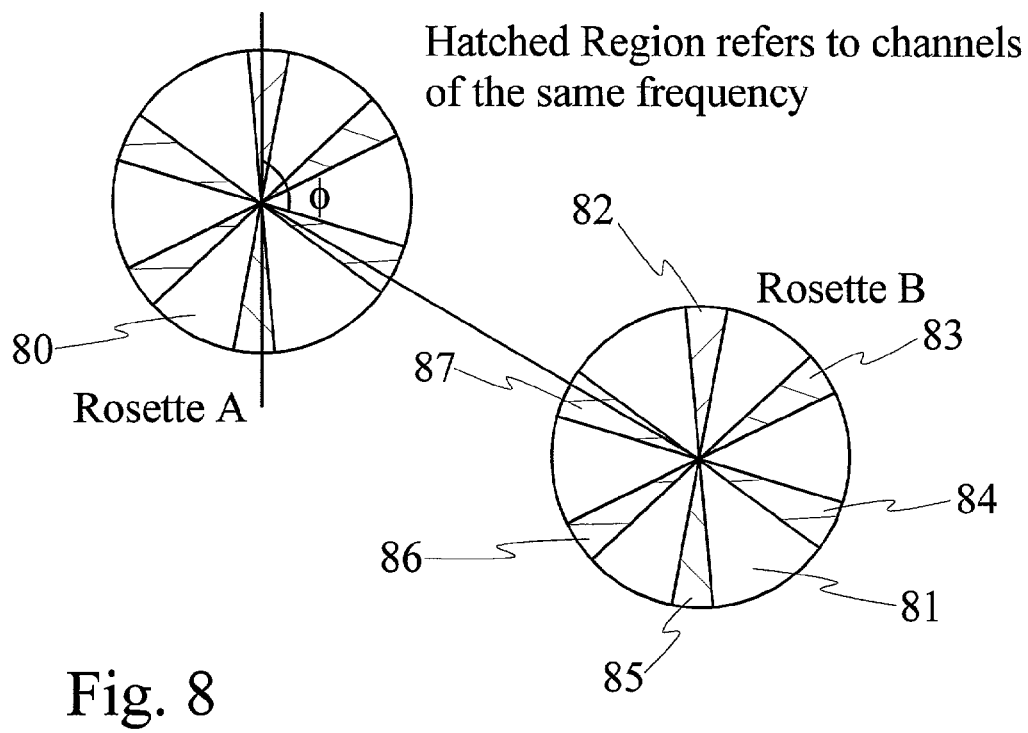
FIG. 8 shows two rosette hubs spaced in relation to each other.

In FIG. 8, an example is shown of two rosette hubs spaced in relation to each other. The first rosette 80 is set up in a location, providing data access to a number of users. Once more demands are placed on the available bandwidth provided by the first rosette 80, a second rosette is provided to handle the increased data traffic. The second rosette 81, should be oriented in relation to the first rosette such that there is a minimal amount of single frequency channel interference between the two rosettes 80 and 81, and that the system capacity is preferably maximized. The sequence of the second rosette EIRP is determined in order to minimize co-channel interference, Co-channel interference is calculated as a ratio is calculated as ratio of desired signal over the aggregate total of undesired signals, including noise, which occupy the same channel.

$$C/(I_0+N_0)$$

Where the desired carrier signal $C=P_R$. the aggregate total of undesired signals occupying the same channel is interference $I_0=I_1+I_i$, and noise=$N_0P_R$ is the total power received by a receiving antenna with an effective area $A_R$.

There are three types of interference, $I_0$, for a single channel: intra-cell interference, or inter-cell interference.

Intra-cell Interference is caused by same channels of a same rosette interfering with one another. The intra cell interference is dependent on the angle of the single frequency channel itself within the rosette 82. Where in this case, $I_i$ is the sum of the five other interfering frequency-like micro-cells, 83 84 85 86 87, from the same rosette.

Inter-cell Interference is caused by same channels of different rosettes interfering with each other. Inter cell interference is dependent upon a distance D from the other interfering rosette hubs, as well as on an angle of the single frequency channel within the interfering rosette.

Power received at an antenna is dependent upon the area of the antenna, gain of the antenna, the angular orientation of the antenna to a transmitter, and the transmitter power EIRP. The path loss exponent is experimentally measured from an outdoor, roof mounted system, where the surrounding environment has moderate foliage providing attenuation to the received signal. Different modulation techniques affect the capacity efficiency of the system. Higher bit rate modulation techniques are more efficient but are also more susceptible to noise. Different modulation techniques are used for different users, depending on the available $C/(I_0+N_0)$. Users having higher $C/(I_0+N_0)$ will therefore obtain higher data transfer rates. The following table outlines the modulation technique which is useable for a given $C/(I_0+N_0)$.

| (C/I (dβ) | Modulation Technique used | Capacity (bit/Hz) |
|---|---|---|
| <10 | None | 0 |
| > = 10 | BPSK (biphase shift keying) | 1 |
| > = 13.6 | QPSK (quadrature phase shift keying) | 2 |
| > = 20.4 | 16 QAM (16-state quadrature amplitude modulation) | 4 |
| > = 26 | 64 QAM (64-state quadrature amplitude modulation) | 6 |

Figure 9:
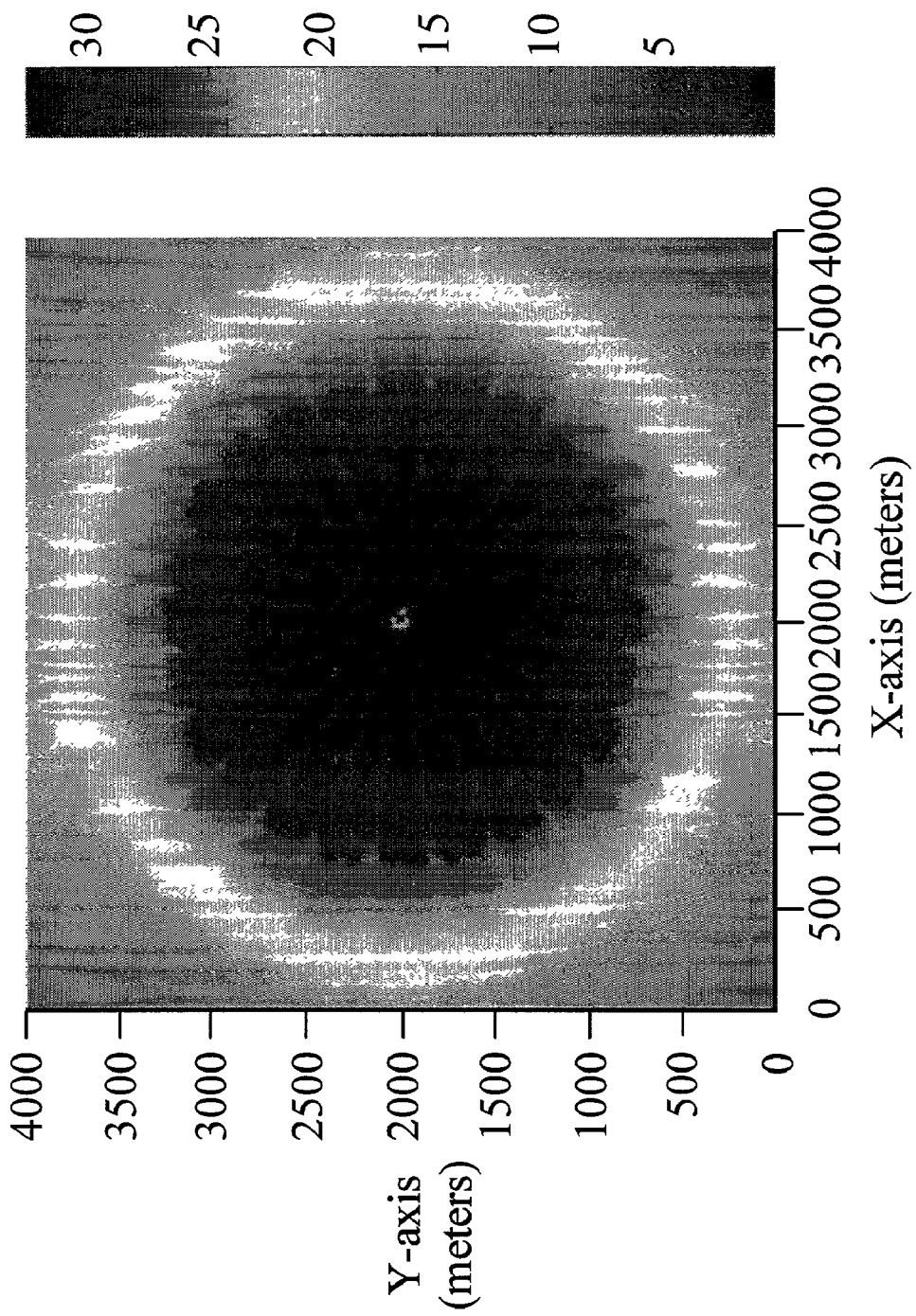
FIG. 9 illustrates a $C/(N_0+I_0)$ distribution plot for a single rosette.

FIG. 9, shows simulation data for a single rosette 80, where in this case the rosette coverage area is 4000 m×4000 m with an EIRP=34 dBm/MHz., 24 petals are shown in the simulated rosette pattern, visually representing $C/(N_0+I_0)$ for the 24 microcells of the rosette. Intra-cell interference, $I_i$, is approximated as a function of the angle. As the angle decreases the transmitting gain of the antenna is reduced with no change in propagation path loss. As a result, the co-channel interference drops.

Co-channel interference deteriorates with distance from the rosette hub center due to the inclusion of noise. As distance from the hub center increases, intra-cell interference becomes less dominant since the intra-ell interference is approximately equal to $C/N_0$ after 1000 m from the rosette center. In this case $I_i=0$ as there are no other rosette used in the simulation.

Figure 10:
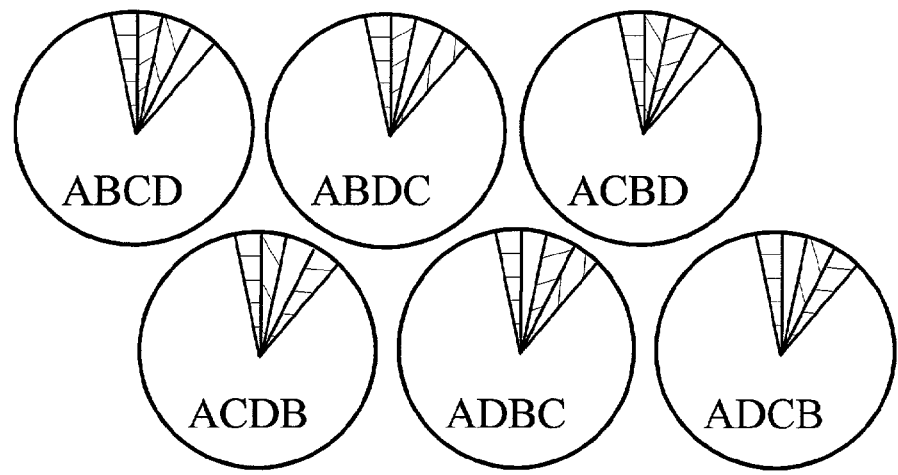
FIG. 10 shows six possible channel sequences for each rosette.
Figure 11:
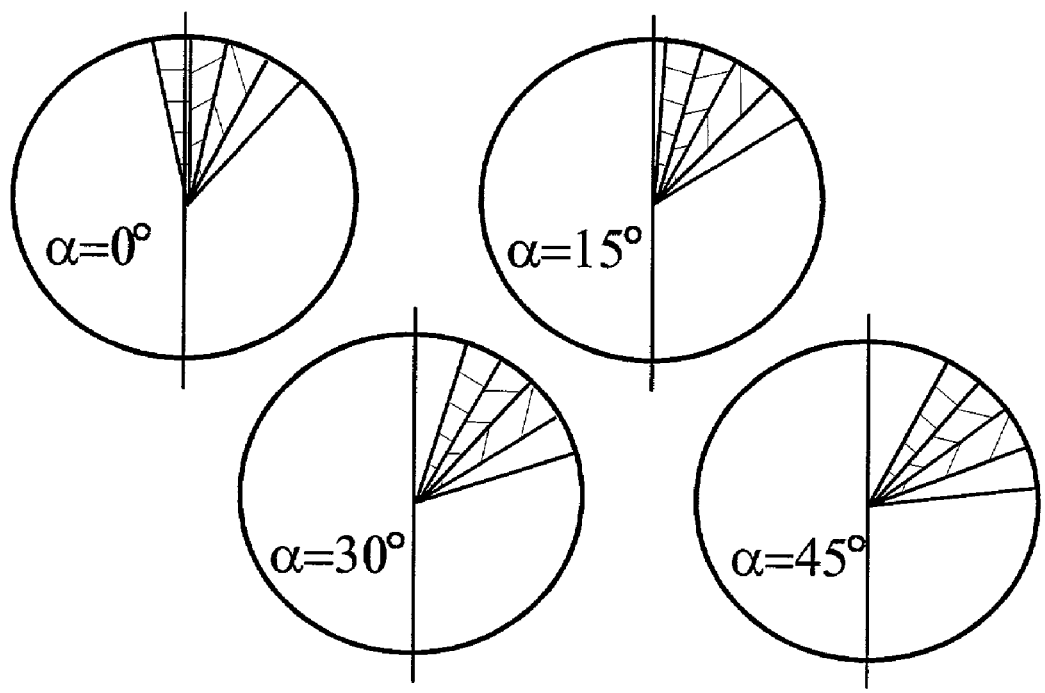
FIG. 11 shows the orientation for each of the four channels within a single rosette in relation to magnetic north,. in a clockwise direction.

Each rosette comprises 24 micro-cells, divided into 4 groups of like-frequency channels, each of which is reused in 6 equiangular spaced intra-cells. FIG. 10 shows the six possible different channel sequences for each rosette. The six possible channel sequences are: ABCD, ABDC, ACBD, ACDB, ADBC, ADCB. Furthermore, each of the four channels within a single rosette are oriented at an angle α, for instance in relation to magnetic north, in a clockwise direction, as is shown in FIG. 11.

All angle measurements are chosen with respect to magnetic north in a clockwise direction. The possible values for the angle, α, are: α=0°, α=15°, α=30°, α=45°. Once the four frequencies within a rosette are orientated at 60°, with respect to magnetic north and in a clockwise direction, the exact same configuration is observed as in orientation at 0°. There are 4 unique angular orientations. Therefore each rosette supports up to a total of 24 different configurations, 4 angular and 6 different channel sequences.

In placing the second rosette 81 in relation to the first rosette 80, care must be taken to minimize the Intra-cell and inter-cell Interferences, The simulation parameters for each of the rosette hubs, 80 and 81 are: EIRP=34 dBm/MHz, Path loss exponent 0.0002D+2.5589. The first hub 80, has a coverage area of 2000 m×2000 m, at an orientation α=0°, with a frequency sequence ABCD, serving 3000 users.

Figure 12A:
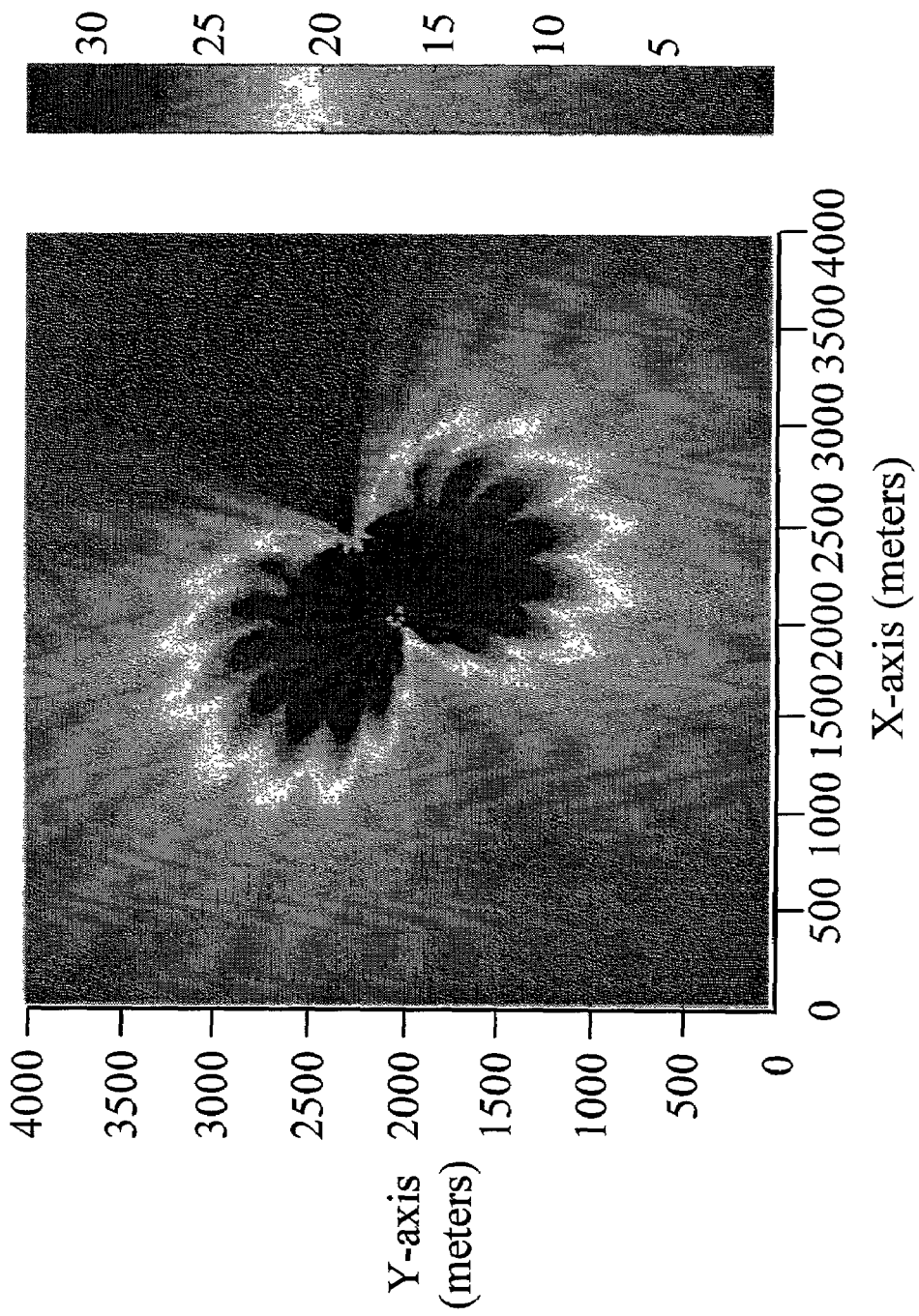
FIG. 12a illustrates co-channel interference for a first hub when a best configuration second hub is placed in relation to the first.
Figure 12B:
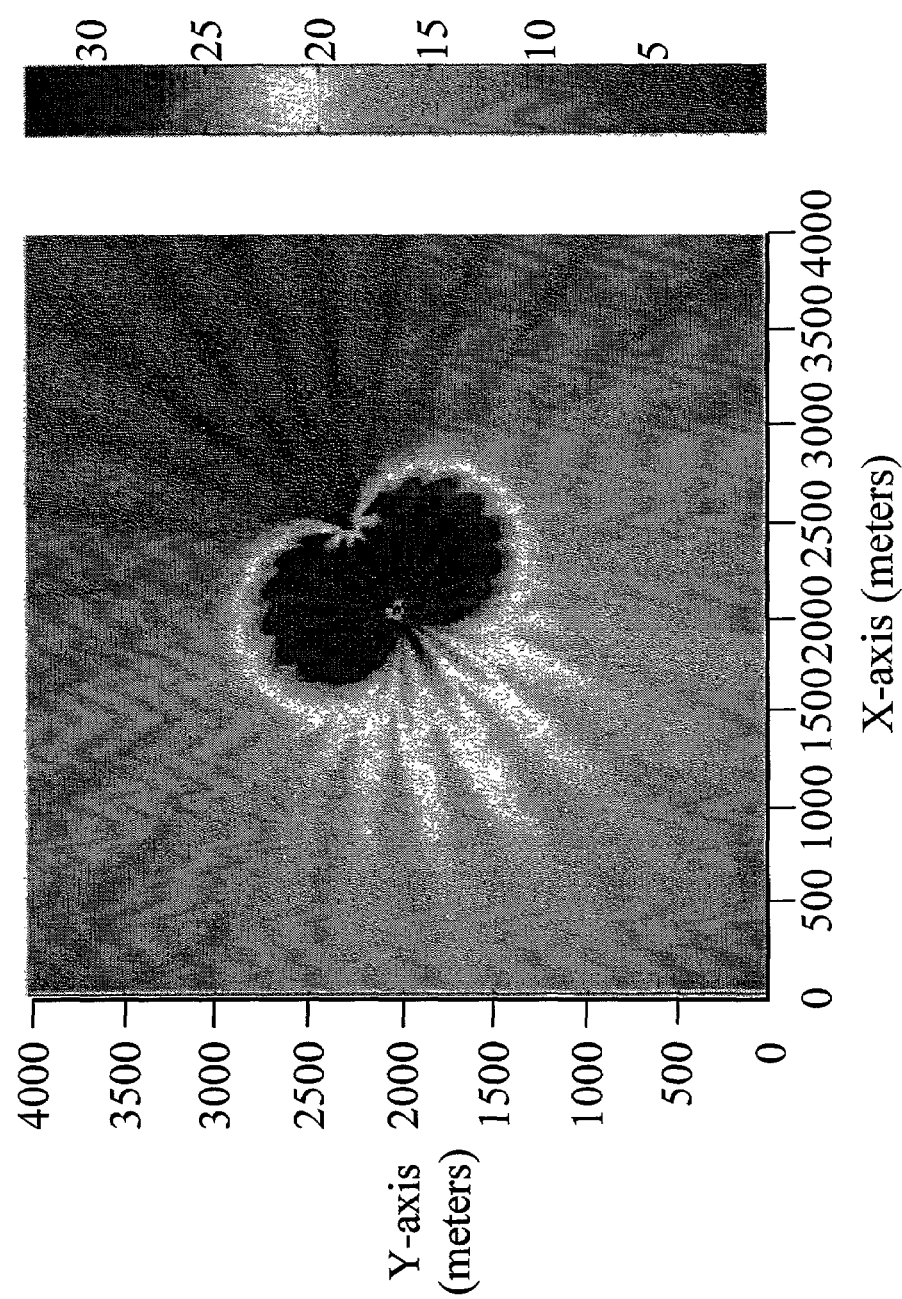
FIG. 12b illustrates co-channel interference for a first hub when a worst configuration second hub is placed in relation to the first hub.

FIG. 12a shows the co-channel interference for the first hub when a best configuration second rosette 81 is placed in relation to the first 80. The second hub 81 is oriented 500 m away from the first and at α=60° in relation to the first 80, using the same frequency sequence as the first, ABCD. A worst case configuration for the first rosette 80, is shown in FIG. 12b, when a second rosette 81, in a worst case configuration, is oriented 500 m away, at an angle α=30°, using the same ABCD sequence. The mean co-channel interference available to existing subscribers is used as a gauge for obtaining the optimum configuration. Clearly the area of minimal co-channel interference for the best case configuration is greater than the area of coverage for the worst case configuration. The best case configuration allows a greater rosette coverage area having minimal co-channel interference.

FIG. 12a represents the $C/(I_0+N_0)$ of subscribers of the first rosette 80. Users oriented in an opposite region of interfering hub receive more interference. This interference is explained by receiver gain, since in this region subscribers' receiver antennas are pointing towards the second hub 81. As a result the receiver gain will be set to near peak gain causing a higher inter-cell interference.

Figure 13:
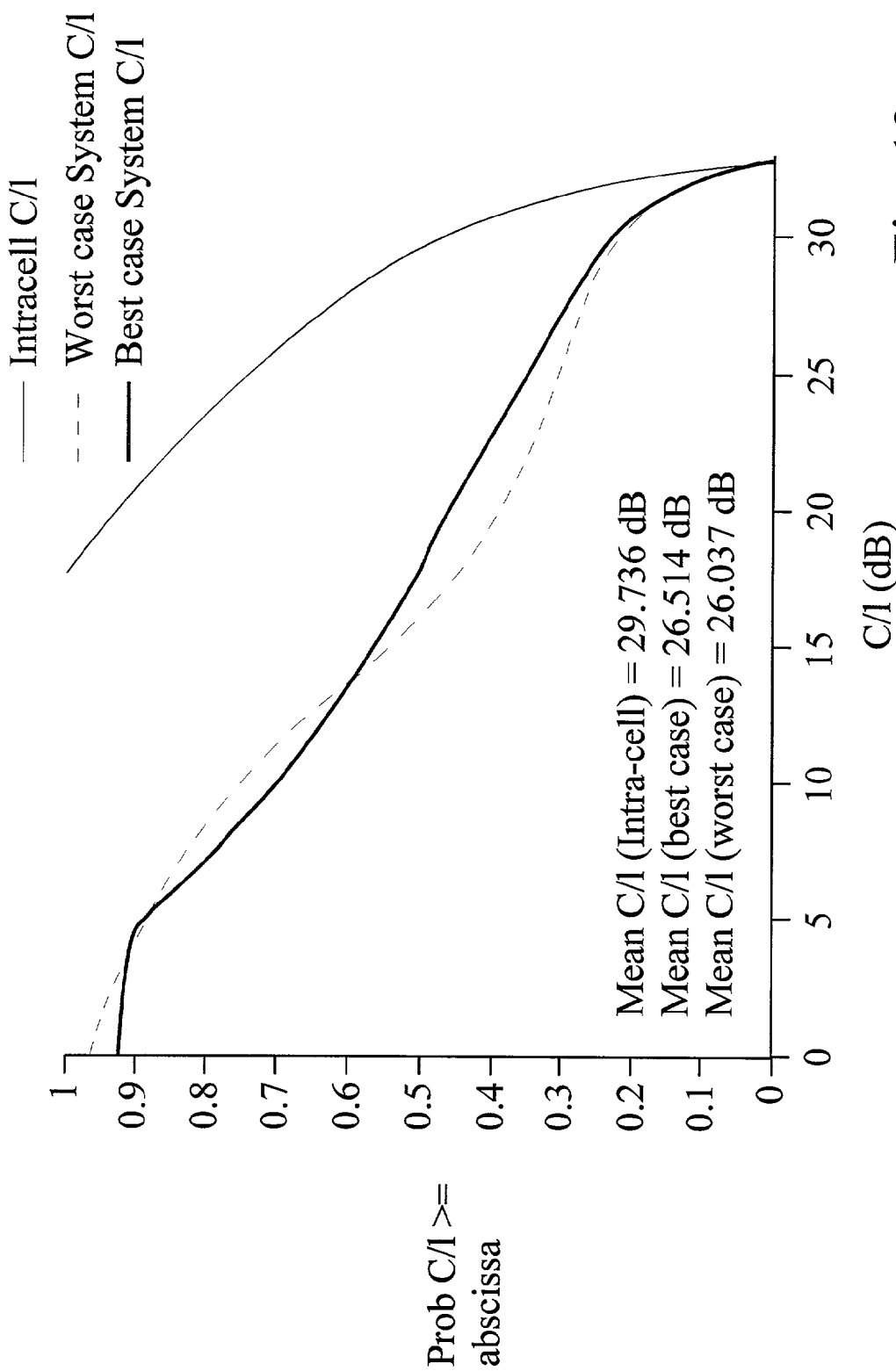
FIG. 13 shows how the installation of a second rosette causes a drop in $C/(I_0+N_0)$ for subscribers using the first hub.

The installation of the second rosette 81 causes a drop in $C/(I_0+N_0)$ for subscribers using the first hub. As is shown in FIG. 13, the co-channel interference drops from 29.736 dB to 26.037 dB. Re orienting and re sequencing the second hub 81 causes improvement to $C/(I_0+N_0)$ for the first hub, up to 26.514 dB. However, this improvement is mostly insignificant. The $C/(I_0+N_0)$ distribution of users varies with different configurations, with little deviation in mean $C/(I_0+N_0)$.

Reducing $C/(I_0+N_0)$ for either of the two hubs is desirable. However in order to offer an increased reduction in co-channel interference, more variability in rosette parameters must be examined. A rosette comprising 48 microcells, divided into 8 groups of like-frequency channels each, with each of which is reused in 6 equiangular spaced intra-cells, yields a rosette with 8 possible angular rosette orientations with 5,040 different channel sequences. Therefore with 48 micro cells each rosette supports up to a total of 40,320 different configurations. Since the number of configurations is greatly increased, there is a higher chance of significantly reducing co-channel interferences.

Figure 14:
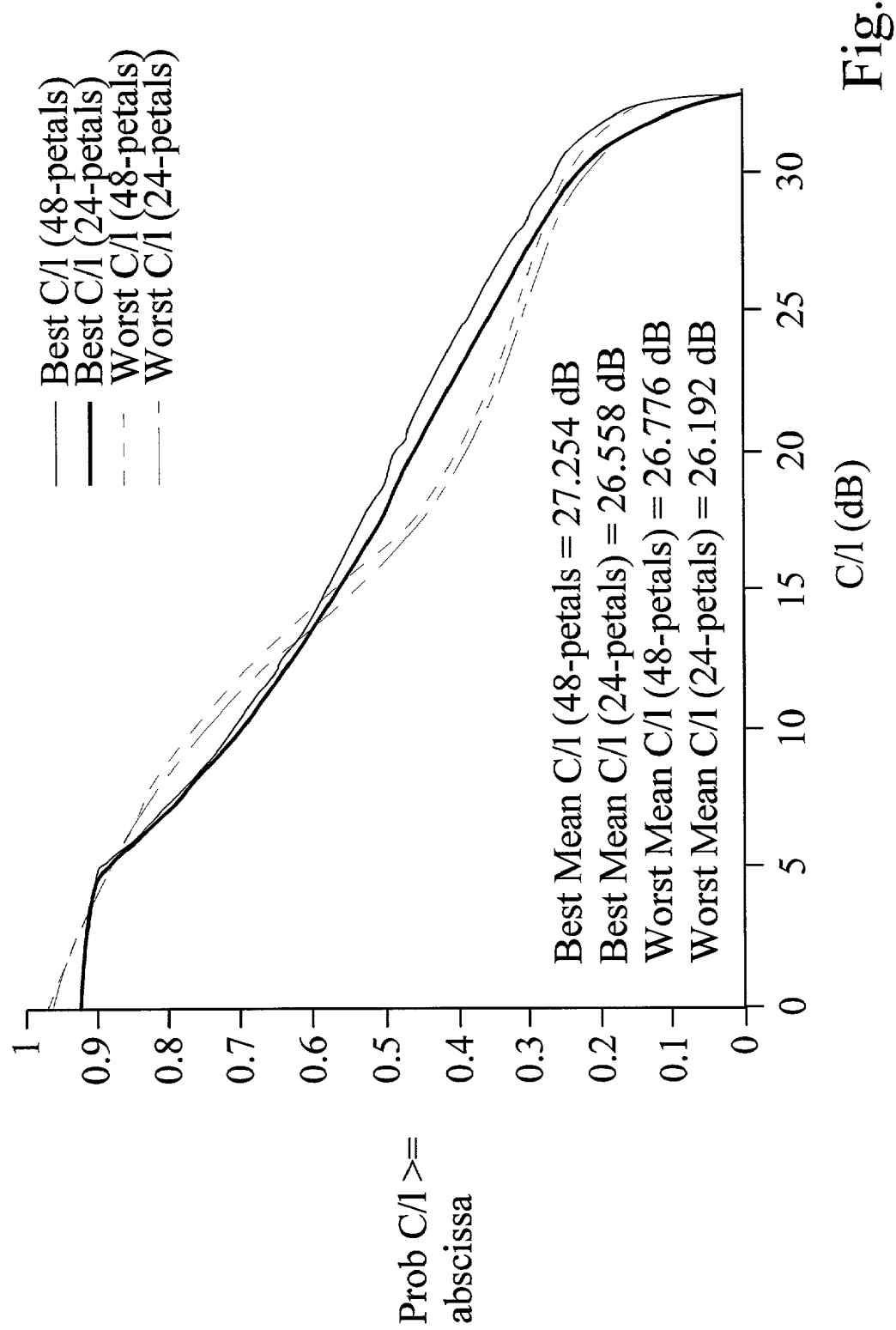
FIG. 14 shows a graph of simulation results comparing interference probability for 24 and 48 petal rosettes.

FIG. 14 shows a graph of simulation results where 24 and 48 petal rosettes are compared. Simulation parameters used for both rosettes are: EIRP=23 dBm/MHz, Path loss exponent=0,0002D+2.7589, Number of users=3000, Range of users=1000 m. The first 48 petal rosette has a coverage area of 1000 m×1000 m, oriented at α=0°, with the frequency sequence ABCDEFGH. The second hub is located at a distance of 300 m form the first, with α=60°.

From simulations it was found that optimum configuration for the first hub's users, based on the mean $C/(I_0+N_0)$ for users of the first rosette, is at an orientation 0° with a sequence of ABCDEFGH. The worst configuration is for the second hub at α=37.5°, with a sequence of ACBDEFGH. For the simulated 24 petal rosette, the optimum configuration yields an angle orientation α=0° and sequence ABCD, while the worst configuration yields an angle α=30°, and sequence ABCD. Therefore with more variable parameters for each rosette, the co-channel interference is reduced.

Doubling the number of channels as in the 48-petals rosette, improves the mean $C/(I_0+N_0)$, regardless of the orientation and sequence of the second rosette. This is due to the narrower beamwidth of each petal within the rosette. The transmitter gain does not decrease with angle for a 48 petal rosette as much as it does for a 24-petal rosette, and therefore $C/(I_0+N_0)$ improves. However, even with an optimum configuration for the second rosette, existing subscribers to the first rosette obtain a decreased $C/(I_0+N_0)$. Considering that twice the amount of equipment is needed for 48-petals rosettes, the additional cost incurred is often not worthwhile for such little performance improvement.

Controlling of the EIRP also allows for improvement in the system co-channel interference. By reducing the EIRP of a most 'interfering' micro-cell from the second hub, the mean $C/(I_0+N_0)$ of the first hub's subscribers will improve. It is desired that any new inclusion of a rosette does not affect the $C/(I_0+N_0)$ of existing hub's subscribers. Therefore modification of EIRP for each petal from within the rosette is performed accordingly.

For simulation purposes after including the second rosette, 81, the following parameters are utilized. At least 80% users falling within the first hub have a $C/(I_0+N_0)$ of >15 dB, and all users of the first hub have a $C/(I_0+N_0)$ of >0 dB.

The EIRP for the first hub is 23 dBm/MHz, the path loss exponent=0.0002D+2.7589. The first hub has a coverage area of 1000×1000 m, with α=0° and with a ABCD sequence. The second hub is located 300 m away, at an angular orientation of 60° to the first, with α=0° and an ABCD sequence. The number of users is 3000.

Figure 16A:
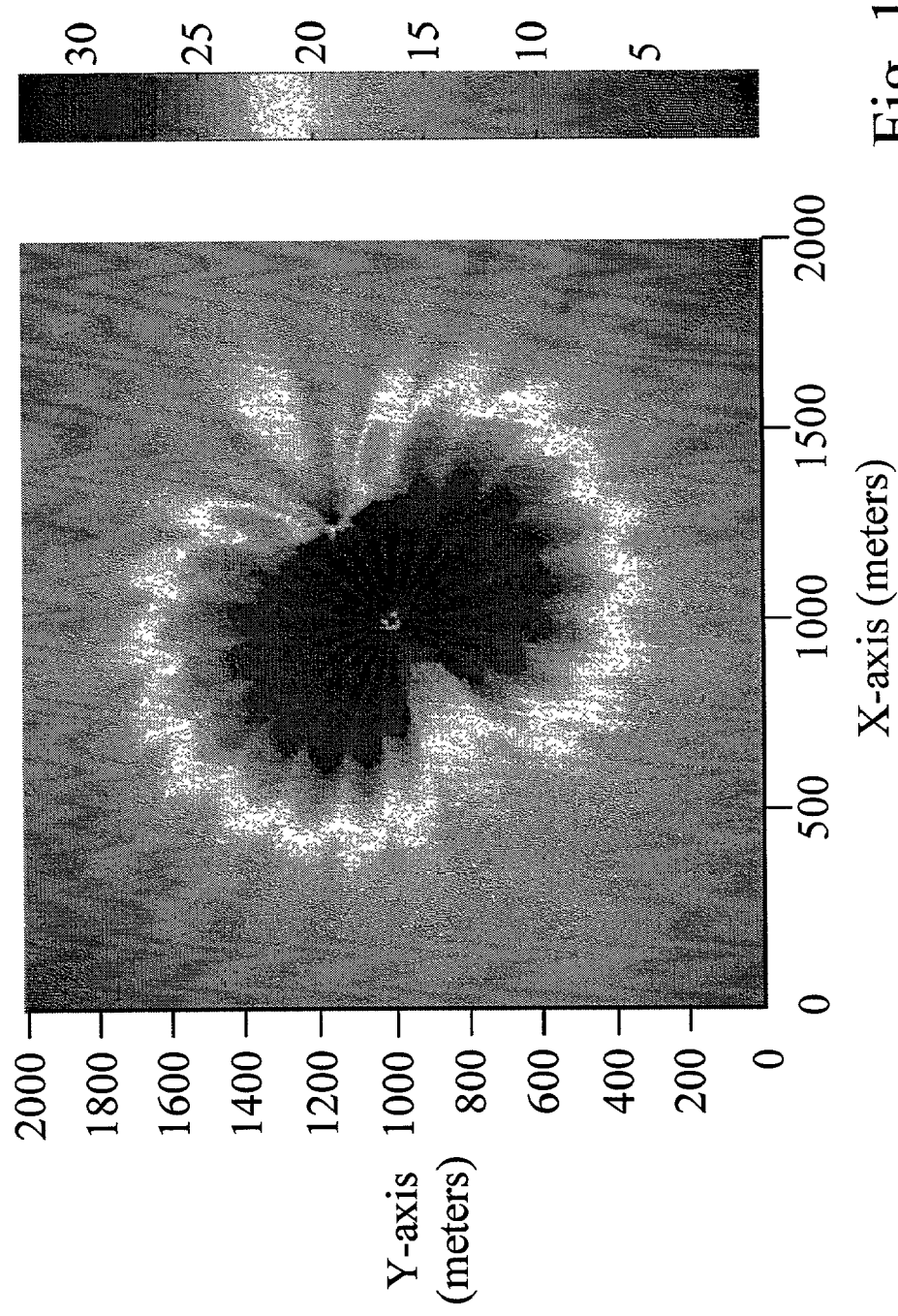
FIG. 16a shows a distribution for the first hub when the second hub has a moderated EIRP.

FIG. 15 shows simulation results for the second hub when the EIRP is varied, or moderated, for each of the petals 1 to 6, in order of angular deviation clockwise from magnetic north. FIG. 16 illustrates the $C/(I_0+N_0)$ distribution plot of the first hub when the EIRP of the second hub is moderated. In FIG. 16a, a distribution plot is shown for the first hub when the second hub has a moderated EIRP.

Figure 16B:
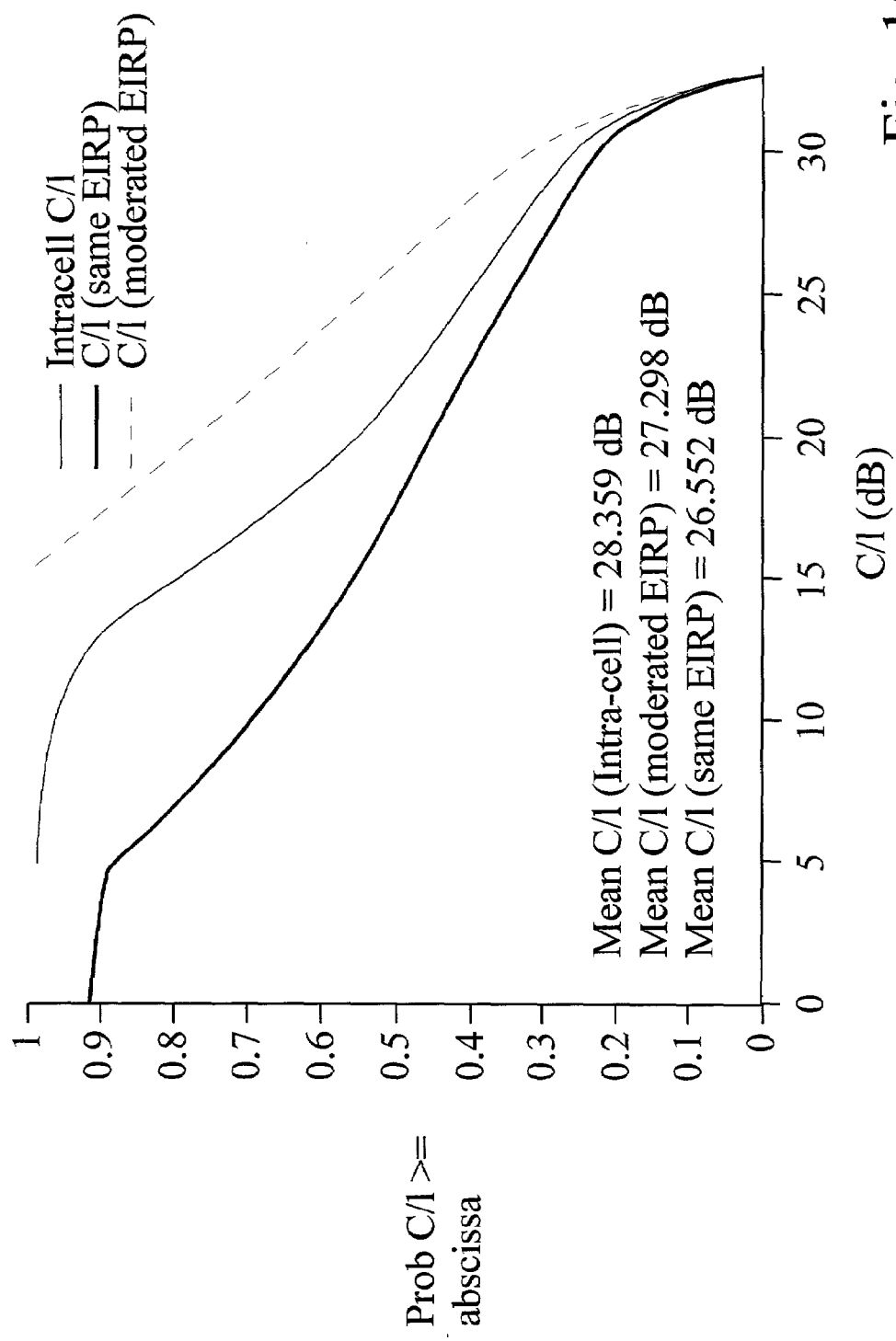
FIG. 16b shows a graph of the interference probability with respect to $C/(I_0+N_0)$ for the first hub when the second hub has moderated EIRP.

FIG. 16b shows a graph where of the interference probability with respect to $C/(I_0+N_0)$ for the first hub when the second hub has moderated EIRP. For each micro-cell within the second rosette, the first rosette's microcell that provides subscribers with the most interference is determined. Then the EIRP of the second rosette's micro-cell is reduced until subscribers provided by that first rosette micro-cell fulfill the two criteria assumptions: at least 80% users falling within the first hub have a $C/(I_0+N_0)$ of >15 dB, and all users of the first hub have a $C/(I_0+N_0)$ of >0 dB.

Figure 17:
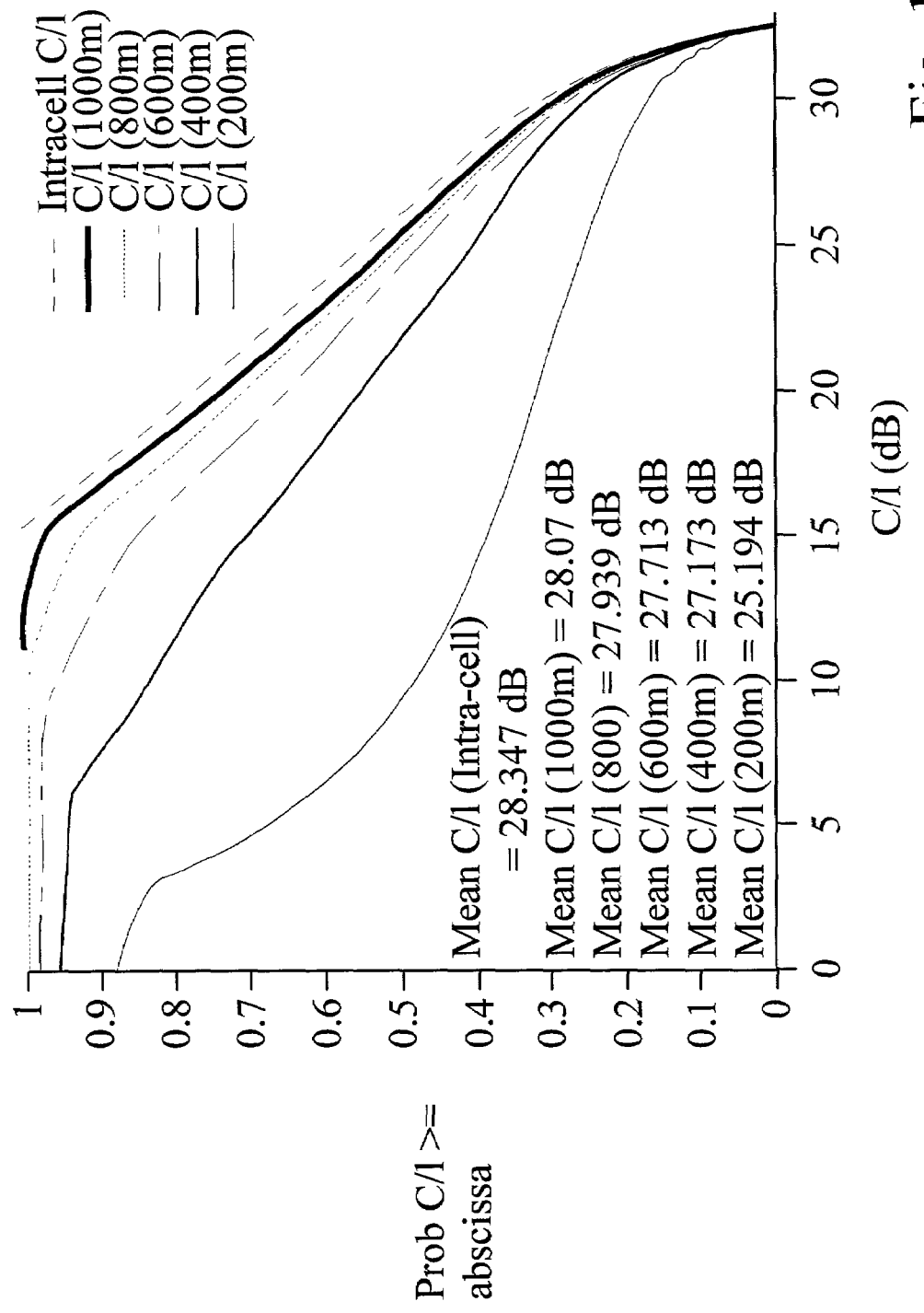
FIG. 17 shows the interference probability vs $C/(I_0+N_0)$ when the spacing between hubs is varied.

Varying the EIRP within the hub is one way to increase the co-channel interference, however determining optimum hub separation is also a possibility for reducing $C/(I_0+N_0)$. FIG. 17 shows a graph of interference probability vs. $C/(I_0+N_0)$. For simulation purposes a fixed EIRP of 23 dBm/MHz is used for both hubs, the path loss exponent 0.0002D+2.7589, the second hub is located 200 to 1000 m away from the first, at an angular orientation of 60° to the first, with 3000 users. In FIG. 17, the $C/(I_0+N_0)$ is determined for subscribers to the first hub as the separation of the second hub is varied from 200 m to 1000 m. For distances less than 800 m the $C/(I_0+N_0)$ distribution approaches $C/(I_1+N_0)$ as intercell interference ceases to be significant and thus moderation the second hubs EIRP is unnecessary.

EIRP Moderation is also a critical parameter for capacity performance. Having a homogenous distribution of users over a fixed area of a region, capacity efficiency is investigated by placing 2 hubs in the region with varying hub separation therebetween. In this simulation the area of a region was 3000 m×3000 m, with both hubs having an EIRP of 23 dBm/MHz., the path loss exponent is 0.0002D=2.7589 and the number of users 1500 per square kilometer of coverage. The first has coverage of 1000 m×1500 m and the second hub coverage varies from 1000 m to 3000 m×1500 m.

Figure 18:
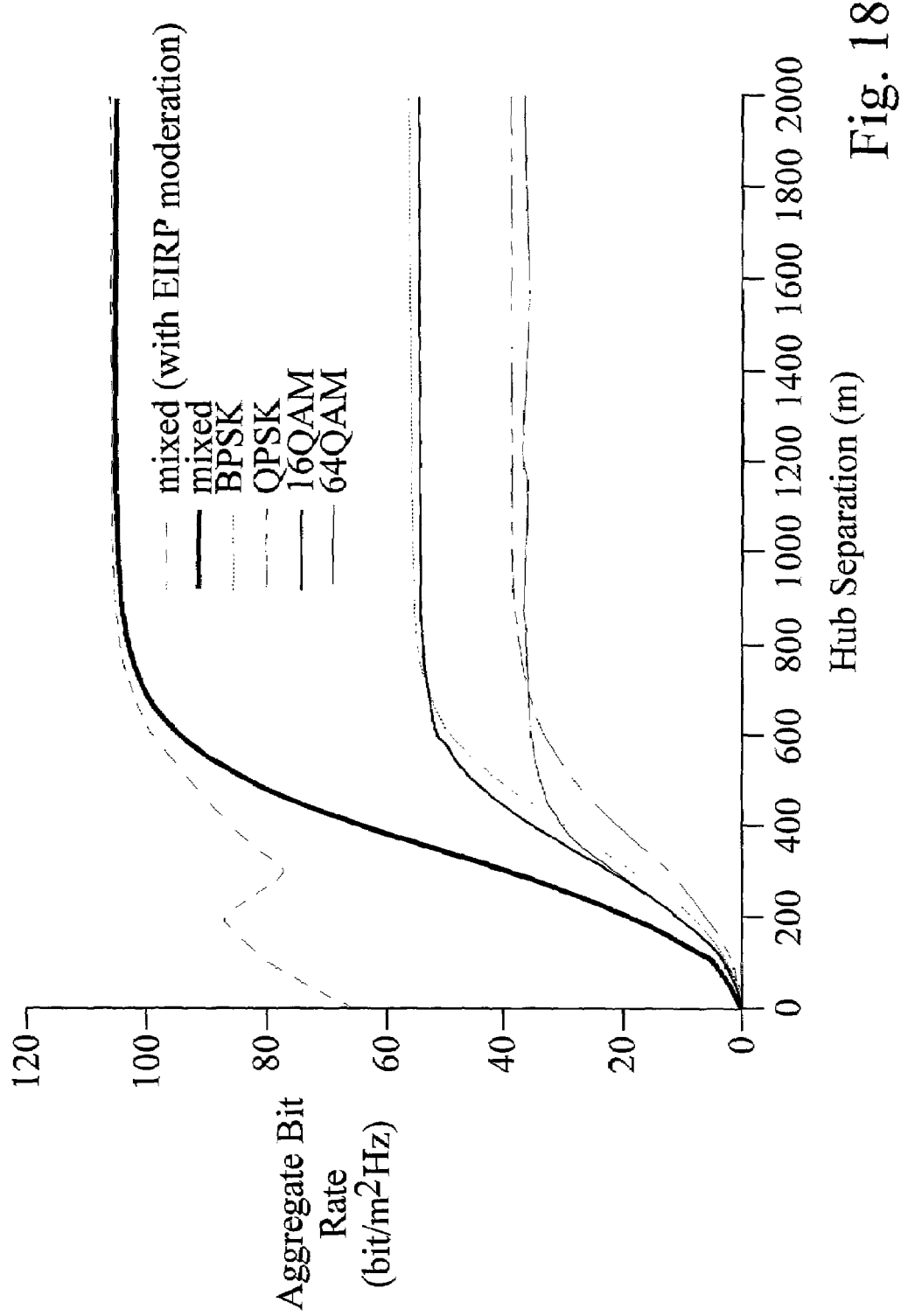
FIG. 18 shows a graph illustrating the relationship between aggregate bit rate and. capacity efficiency in terms of data capacity.

FIG. 18 shows a graph illustrating the Aggregate Bit Rate vs. Capacity Efficiency plot for capacity performance. Capacity efficiency initially exhibits an almost linear relationship with hub separation and remains constant after a certain distance as inter-cell interference becomes negligible. Different modulation techniques exhibit merits over other modulation techniques for various hub separations. In tests, a mixed modulation technique yielded the best performance. Advantageously when EIRP moderation is used, capacity efficiency receives a 50% –400% increase for small hub separations.

Receiver acceptance beamwidth is also critical to system performance. Antennas having a wider beamwidth have lower manufacturing cost. However using these wider beamwidth antennas is desirable as long as $C/(I_0+N_0)$ performance is not compromised. FIG. 18 shows simulation results for four different antenna gain patterns for various beamwidths.

Figure 19A:
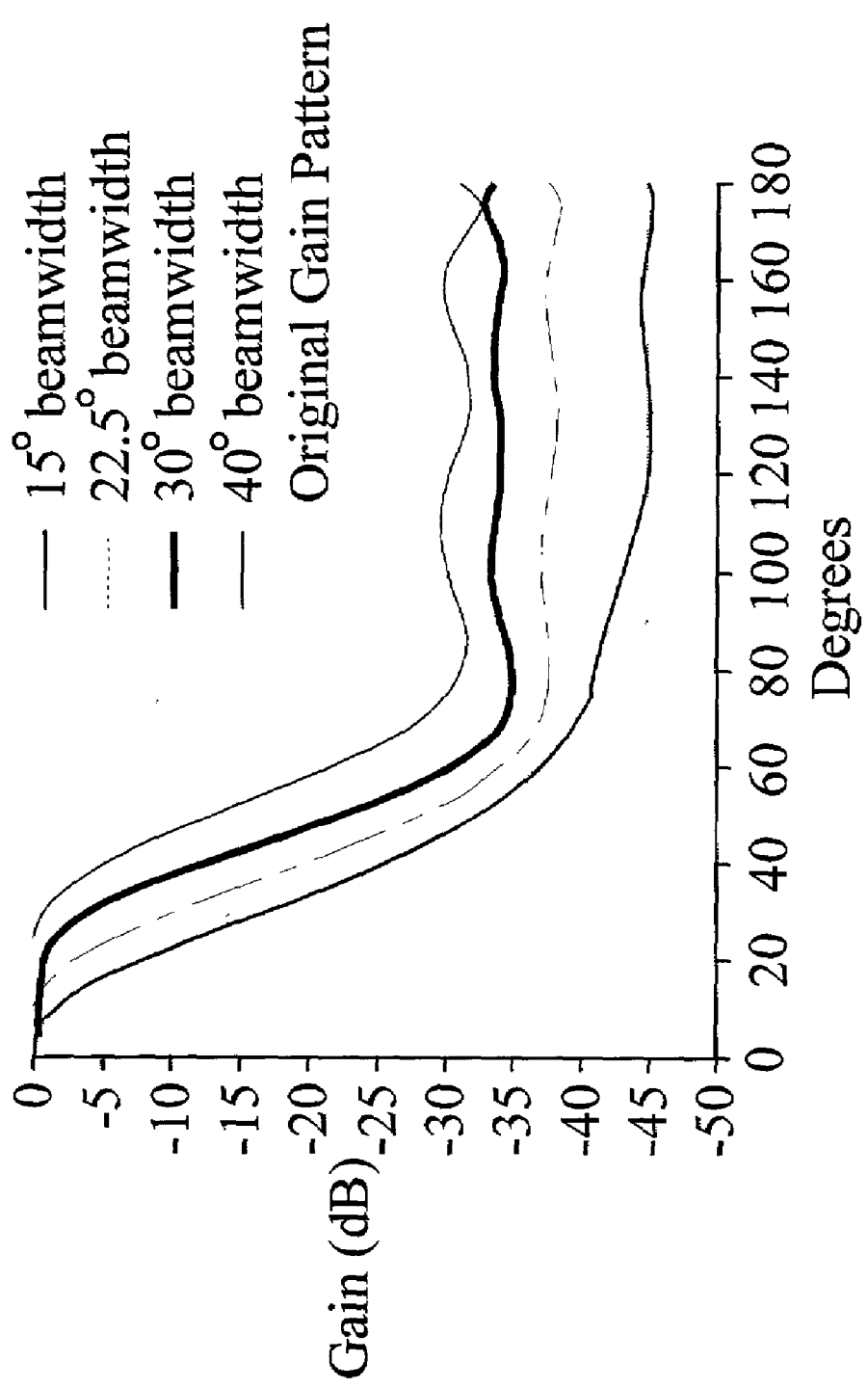
FIG. 19a shows the effect of co-channel interference probability for subscribers having different antenna beamwidths.
Figure 19B:
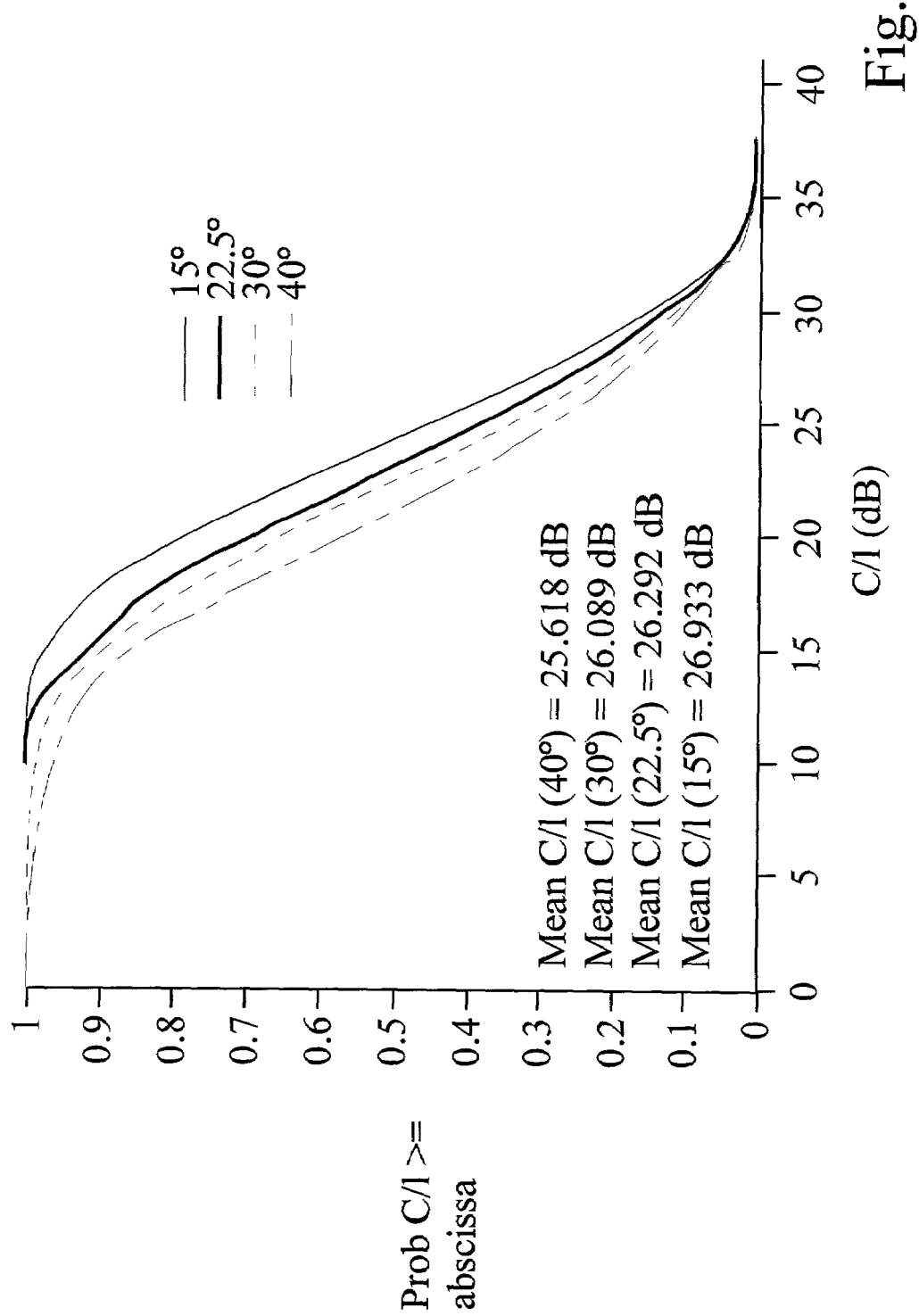
FIG. 19b shows a $C/(I_0+N_0)$ interference probability curve as a function of different antenna beamwidths.

FIG. 19 shows the effect of co-channel interference probability for subscribers having different antenna beamwidth. In the simulation a coverage area of 3000m×3000 m, with a path loss exponent=0.0002D+2.7589 and 1500 users per square kilometer is assumed. Increasing the beamwidths of the subscribers' antennas results in more susceptibility to interference. Unfortunately, increasing the system co-channel interference leads to deterioration of system capacity.

Figure 20:
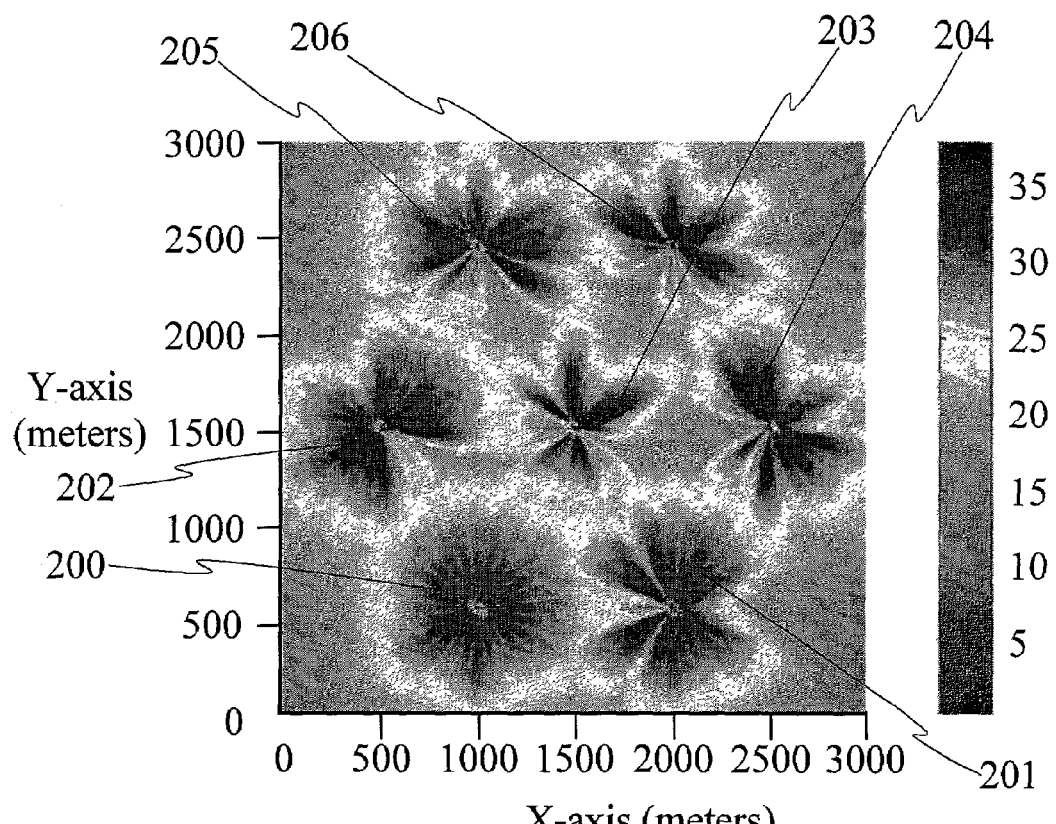
FIG. 20 shows a $C/(I_0+N_0)$ plot for a system comprising 7 rosettes placed in spaced relation to one another.

FIG. 20 shows a $C/(I_0+N_0)$ plot for a system comprising of 7 rosettes placed in spaced relation to one another. A first rosette, 200, is initially disposed at a first location. From the resulting co-channel interference from this rosette it is evident that this rosette is placed first into the system since it's distribution is fairly symmetric about the hub center. Additional rosettes were added in order from left to right and from bottom to top, in sequence, up to rosette 206. For this simulation the coverage area is 3000 m×3000 m, with a user density of 1500 per square kilometer, wherein users are distributed homogeneously. The path loss exponent=0.00002D+2.27589 and the default EIRP=23 dBm/MHz.

From the co-channel interference distribution shown in FIG. 20 it is evident that there are gaps between the rosettes where the $C/(I_0+N_0)$ is low. These are primarily due to two factors: EIRP moderation and inter-cell interference. EIRP moderation results from regions which are supported by low EIRP micro-cells. It is desirable to increase the $C/(I_0+N_0)$ of these gaps so as to maximize system data capacity.

A first solution for increasing the co-channel interference of the system is to re-orient and re-sequence channels of the new rosettes. The new added rosette is re-orientated and re-sequenced an optimum configuration is determined, such that number of users receiving a co-channel interference of >15 dB is maximized.

A second solution is to directly increase the EIRP of the micro-cells, however, this needs to be done without the expense of decreasing the already existing $C/(I_0+N_0)$ available to the users. EIRP moderation is performed for non-interfering petals for the new rosette which are interfered by existing rosettes. The EIRP is increased until $C/(I_0+N_0)$ of all its users>15 dB, thereby offering an improvement in system data capacity.

Figure 21A:
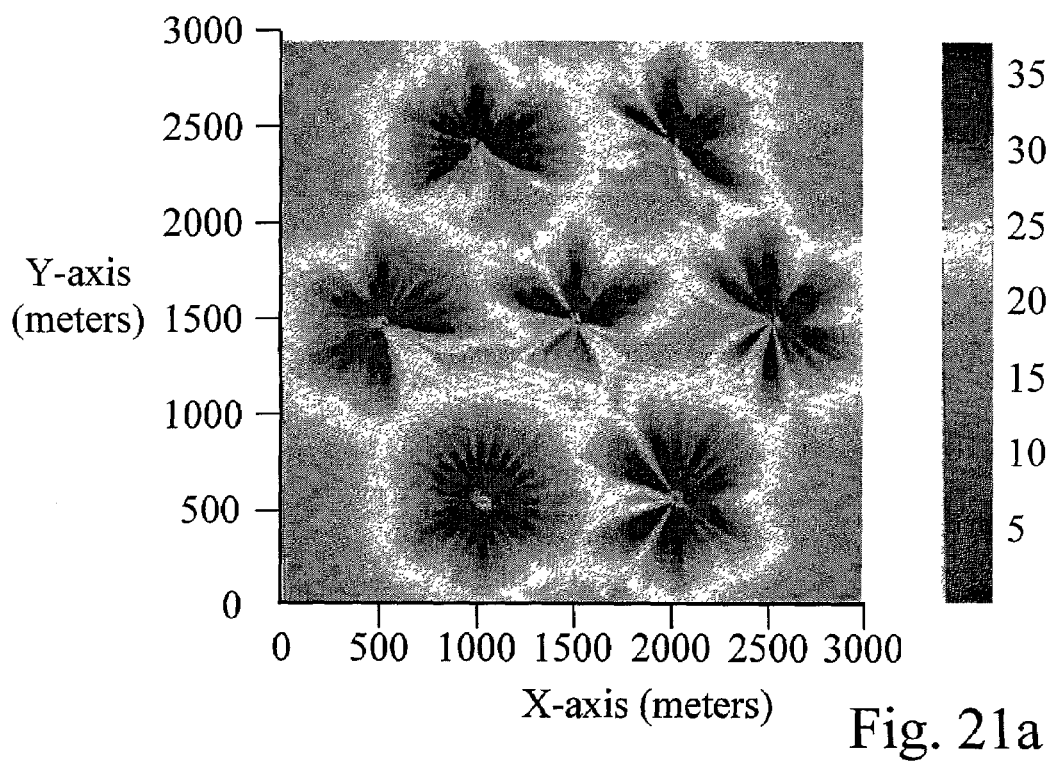
FIG. 21a illustrates a $C/(I_0+N_0)$ distribution plot for an increase in EIRP without the expense of decreasing the already existing $C/(I_0+N_0)$.
Figure 21B:
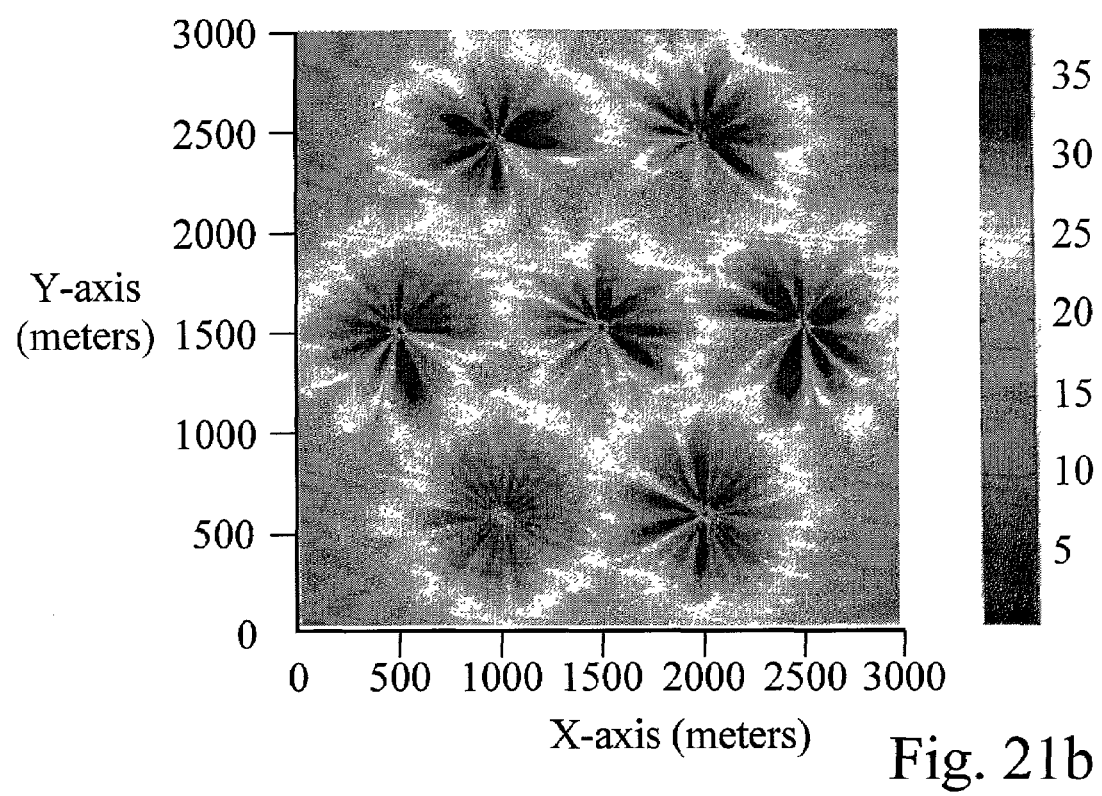
FIG. 21b illustrates a $C/(I_0+N_0)$ distribution plot for a 7 rosette system according to a third solution.

A third solution is to combine the first and second solutions. FIG. 21a illustrates a $C/(I_0+N_0)$ distribution plot for a 7 rosette system according to the second solution; and FIG. 21b illustrates a $C/(I_0+N_0)$ distribution plot for a 7 rosette system according to the third solution. The capacity efficiency for different modulation techniques is shown in FIG. 22.

Rosette systems have been described in detail in U.S. patent application Ser. No. 09/305/672. These high speed wireless systems are designed for license-exempt application where there may be a plurality of hub stations run by independent service providers or in licensed frequency applications where the a service provider has a high density of terminals. In either case a high level of co-channel interference sometimes arises which is due to inter-cell emissions of signals between rosette cells. Furthermore, in a license-exempt environment, there may be other users of frequencies within the channels, not associated with the rosette system who also produce co-channel interference. Detecting this co-channel interference is important to the preservation of a meaningful communication links, and as well, to protecting against interference with the source(s) of the interference, which can be one or more co-channel users.

In both the licensed and unlicensed applications there may also be the problem of sharing the channel on a non-interference basis with users which are not communication links. Such users may be radiolocation systems and Earth Exploration Satellite Systems (Active). These co-channel users may have regulatory rights to share channel with the rosette, or may even hold primary rights, requiring the rosette to move off the channel or cease transmission for some duration until the primary user has terminated its transmissions. To do this there is a requirement of the rosette system technology to be capable of detecting the presence of primary users' signals or signals of the users which share the channel on an equal basis, and to limit the transmissions from the rosette in such manner that co-channel interference is not problematic. This undertaking commonly is called Dynamic Frequency Selection (DFS) and implies that a radio communications device is capable of dynamically selecting a useable channel only after non-interference has been established. If the channel is shared on a secondary basis with a primary user, the radio communications device must be ready to detect the presence of the primary user and within a specified time, move to another channel or terminate its communications. In a shared channel situation, the terminal ensures that signals do not interfere with the shared user. This may entail reducing the power on the communications link to lower limit or moving to another channel, or simply ceasing communications until the shared channel user no longer was detected. There is usually a regulatory etiquette or channel occupancy requirement as to how a shared channel users operate on a co-channel basis. In a primary/secondary allocation it is incumbent for the secondary user to mitigate its transmissions when a primary user is operating.

Many types of co-channel interference are experienced by the rosette system and need to be mitigated thereby. The rosette with its high directivity antennas and low side lobe levels significantly mitigates intra-cell co-channel interference as described above. These qualities in electromagnetic performance also give the rosette a significant degree of robustness in face of interference and furthermore, are beneficial to maintaining an overall low level of co-channel interference to other users, which is a positive feature.

In the event that co-channel interference is detected on a specific petal, or it is determined that a petal is causing co-channel interference, that petal and its associated channel can be removed from operation, thereby mitigating the co-channel interference effects. The act of removing a single or few petals due to co-channel interference, results in the preservation of the remainder of the rosette's capability to maintain communications link; a feature that is lost with omni-directional or large sector cellular systems. This ability to localize and isolate sectors having co-channel problems in a dynamic manner is exploited within the rosette, but requires the incorporation of a number of technical features.

Total removal of a petal or petals would be detrimental to the subscriber terminals within the affected petal unless they can be offloaded to adjacent petals. However, to do this requires that the control system of the rosette have a record of each terminal's signal quality and reception characteristics of other adjacent petals' channels, which is information that can only derived by the subscriber terminal with subsequent transfer to the control system physically resident at the hub of the rosette.

Total removal of sectors from the rosette need not always be exercised as a means of interference control. The concentric assemblage of petals around the rosette with its periodic distribution of channel frequencies lends itself to another important attribute of the rosette: the ability to alter its EIRP contour as a function of its azimuth angle—perimeter position—and to effectively rotate the constellation of its channel frequencies distributed in the azimuth angle (perimeter position). These attributes are especially useful when rosettes become located close to each other. Given that it is expected that rosettes will be installed on an ad-hoc basis by service providers that may or may not know of the presence of each other, it is then incumbent of the rosettes to be able to adapt their EIRP contours and channel frequency distributions automatically and in such a manner that co-channel interference is limited. Methods and processes have been developed which allow such contours to be produced in such a manner that the mean co-channel interference (MCCI) level of the assemblage of rosettes is both established and preserved as rosettes are added on an ad-hoc basis. Such operation requires several characteristics. First of all, there must be an etiquette that is respected by all the rosettes of this proposed system This is the etiquette of First Come/First claim. By that it is meant that the first rosette installed in service area establishes an EIRP contour that is non-interfering of other non-rosette users of the commonly claimed channels, accordingly, be it on a primary, secondary, or any other basis as deigned by the regulations. Once this contour is established it will be maintained and de facto claimed. Subscriber terminals will become associated with the rosette only after the contour is established. If primary users occupy the channel frequency after the de facto claim, then the rosette will offload subscriber terminals or in the worst case, abandon them. If secondary users, not associated with the rosette occupy the channel frequency, then offloading of subscriber terminals will be exercised and in worst cases abandoned.

If secondary rosettes, come to the service area after the first rosette, the secondary rosette will adjust its EIRP contour and channel frequency plan in such a manner that the subscriber terminals registered on the first rosette are minimally affected.

Abandonment of subscriber terminals as mentioned may on occasion occur. This is a risk that is inherent with the license-exempt operational scenario where other primary users may be present, or when shared channel users are present. In the shared channel case, it is likely that the other users will be operating at same frequencies. The first rosette will of course have particular radiation pattern. There will be a sequence of frequencies distributed in a repeating pattern around the rosette, there may or may not be missing sectors due to the identification of co-channel radiation sources that were established prior to the first rosette; these may for instance be radar systems which, for example in the 5–6 GHz band, of have primary allocations of channels.

For the case where the adjacent interferer is another rosette, the deformation of the radiation EIRP pattern and the sequence of frequency (Frequency Sequence Code: FSC) bands around the perimeter is based on the distance separating the rosettes, the FSC of the interfering rosette, the EIRP of the interfering rosette's cells, and the long term estimate on the propagation path loss exponent for the link path between the rosettes. Some of these parameters are embodied in a special Medium Access Control (MAC) layer word that is broadcast on occasion by every rosette. The control word is called the Radio Frequency Management Message (RFMM), and it will be detailed below.

Every rosette broadcasts an RFMM. Consider the first rosette that is installed in a service area. We assume that the rosette uses a complement of license-exempt frequencies and that interferers, some of which may be rosettes and others which may be none-rosette Wireless Access Stations (point to point), RLANs (ad hoc, mobile, or nomadic), or Metropolitan Area Network (MAN) wireless nodes—hub stations or subscriber terminals operating at a distance from the MAN hub in a point to multipoint configuration, are yet to be in place. This first rosette, which is also the first occupier of the service area, monitors the environment by tuning to every transmit channel that can be assigned to each petal, and for a period of time, monitors for co-channel interference. This interference manifests itself in several ways. If the interference is due to a non-rosette device, the signal will appear as a interference power at some level above the thermal noise floor of the receiver. This level of interference is estimated and classified by an Interference Signal Processor (ISP) and passed to the Mean Co-Channel Signal Level Processor (MCCSLP). Within the ISP the interference is classified by its characteristics: if it is continuous or bursty in an aperiodic manner, it can be generally construed as being due to a communications link signal. If it is pulsed with long term periodicity it can be construed as a radar signal and conceivably further identified by radar signal characteristics such as scan interval, pulse duration, pulse repetition rate, rise time, fall time, and nature of modulation (such as continuous CW, FM, or FM chirp).

For example, in an urban environment, given the low Effective Isotropic Radiated powers that are allowed by regulatory authorities for license-exempt applications (such as the 5 GHz UNII band), cell hubs can be separated by distances of only 500 meters. Since the rosette is a high frequency reuse hub station, a multiplicity of such hub stations can be subject to significant co-channel interference.

Figure 23:
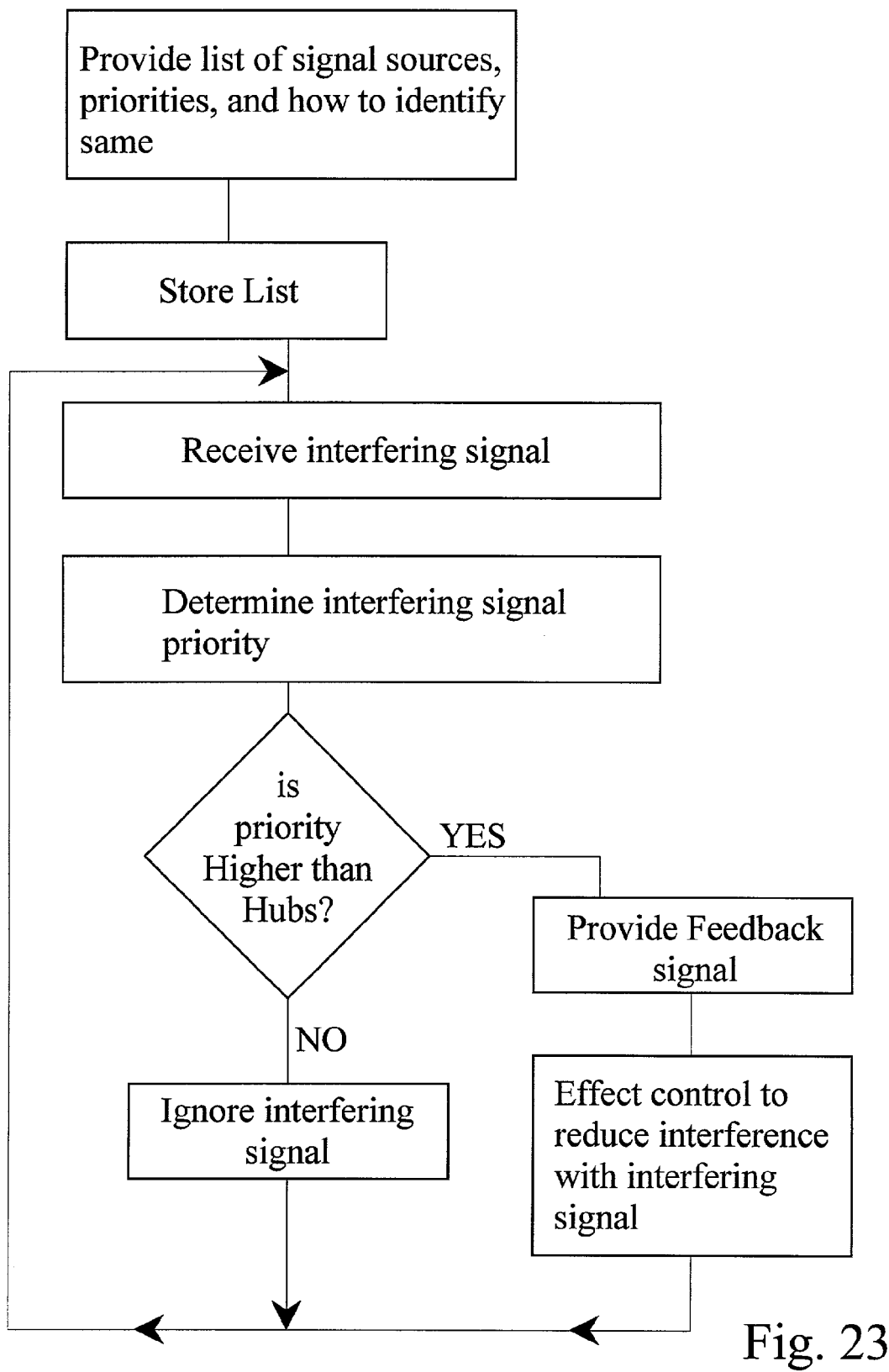
FIG. 23 illustrates a simplified flow diagram of a method of effectively filling unused bandwidth without affecting bandwidth allocation.

In order to implement the system of the present invention, it is highly beneficial to make use of all unallocated bandwidth. Unfortunately, bandwidth is in high demand and is allocated to many different functions. Some of these functions such as earth exploration satellite systems (active) (EESS) and radar make use of the bandwidth in highly inefficient manners. For example, a (EESS) uses a frequency band reserved for earth exploration and imagery on an occasional basis, usually once every 5–20 days over the same region of earth. Typically, such a satellite only transmits Synthetic Aperture Radar signals to the earth at substantial intervals and for very short durations. As such, much of the time the bandwidth remains unused. For RADAR systems, the issues are different. Here the bandwidth is used most of the time, but only in very isolated locations. Thus in most places the bandwidth remains unused. FIG. 23 is a simplified flow diagram of a method of improving bandwidth utilization by supporting different priority levels for different signals wherein signaling systems having lower priorities cede in the presence of signals having higher priorities.

As is evident to those of skill in the art, either system uses its bandwidth in a far less than efficient fashion. That said, it is important to maintain the bandwidth allocation for each of these important and expensive systems. Referring to FIG. 23, a simplified flow diagram of a method of effectively filling unused bandwidth without affecting bandwidth allocation is shown. Here, a plurality of known signal sources are identified and prioritized in a hierarchical fashion. The list of known signal sources is stored along with signature data indicative of a method of identifying signals from each of the sources.

Each system is now provided with a receiver for receiving radio frequency signals and a processor for processing thereof to determine a source for or a signature of the received signal. When the determined source or signature is indicative of a source having a higher priority than the system in which the processor is located, the processor provides a feedback signal to a control circuit. The control circuit acts to control the system to prevent interference with the higher priority signal. Typically, this is achieved by turning off any transmitter that potentially interferes with the higher priority signal.

For example, when the higher priority signal originates from a satellite, the transmitter or transmitters are turned off for a short period of time until the signal of higher priority ceases to be received. When the higher priority signal originates from a RADAR system, then the hub is reconfigured to other than interfere with the RADAR signal. This may require repositioning of the hub, replacing one or more transmitters within the hub, changing frequency allocation of the hub, ceasing transmission in certain petals of the rosette produced by the hub and so forth. Of course, the action taken is more of a permanent correction than was necessary when the satellite signal was detected.

Though the potential corrective actions seem onerous in some cases, the resulting additional available bandwidth makes onerous changes in the presence of higher priority signaling worthwhile in most cases.

Of course, when the detected signal is of a lower priority than the signals with which it interferes, the hub takes no corrective action. Alternatively, the hub takes corrective action in accordance with predetermined preferences set by the hub operator.

Preferably, the processor is provided with an updated list of priority signals and signatures whenever the list is changed.

There are numerous possible corrective actions for ensuring that interference does not occur. For example, a frequency within the interfering area may be changed, transmission may be interrupted, signal strength may be modified, signal angle may be corrected, EIRP of signals may be adjusted to ensure better range for preventing interference and so forth.

Figure 24:
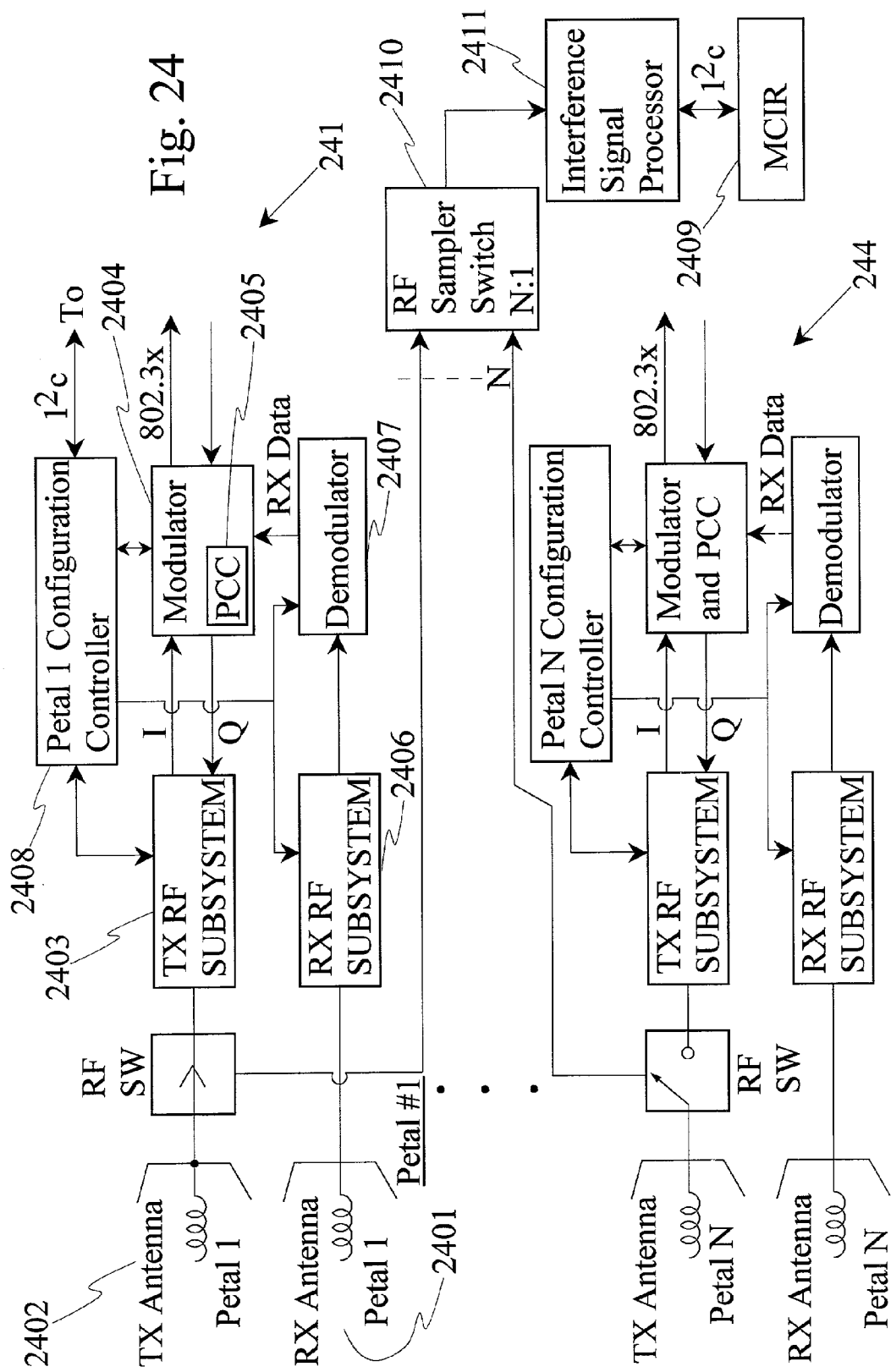
FIG. 24 is a simplified block diagram of a full duplex petal configuration for a system according to the invention; and, FIG. 25 is a simplified block diagram of a system according to the invention.

Referring to FIG. 24, a block diagram of a system according to the invention is shown. Here a first petal 241 and a Nth petal 244 are shown. Each petal includes an antenna 2401 for receiving RF signals and an antenna 2402 for transmitting RF signals. The transmit antenna 2402 is coupled to transmit hardware 2403. The receive antenna 2401 is coupled to receive hardware 2406. The transmit circuitry includes a modulator 2404 for modulating data within the signal and the receive circuitry includes a demodulator 2407 for extracting data from a received RF signal. An interface circuit 2405 interfaces with wired communication systems.

A petal configuration controller 2408 is coupled to each petal for providing for petal related information gathering and for petal related control. The petal configuration controller 2408 is coupled to a microcontroller 2409 for determining control data based on data and feedback received at the antennas as sampled at RF sampler 2410 and processed at interference signal processor 2411. The microcontroller 2409 is for providing the control data to the petal configuration controller 2408 for modifying configuration of a petal. Of course, since each petal is similar, control of individual petals or of all petals is possible independently or in conjunction one with another.

Figure 25:
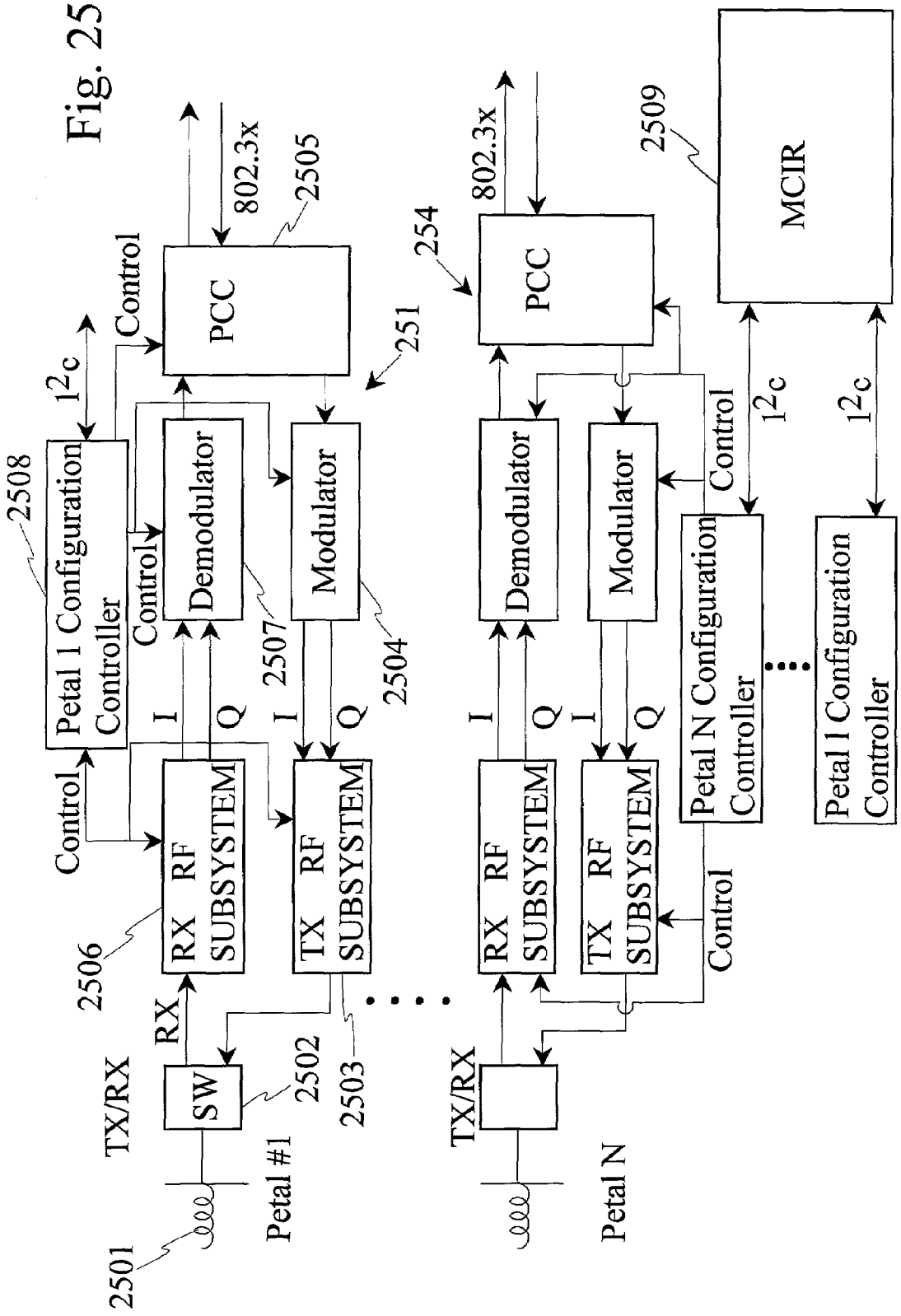

Referring to FIG. 25, a block diagram of a system according to the invention is shown. Here a first petal 251 and a Nth petal 254 are shown. Each petal includes an antenna 2501 for receiving RF signals. The antenna is coupled to transmit hardware 2503 through a switch 2502. The switch allows signals to be switchably received by antenna 2501 and provided to the RF signal receive hardware 2506 or transmitted from the transmit hardware 2503 to the antenna 2501. The transmit circuitry includes a modulator 2504 for modulating data within the signal and the receive circuitry includes a demodulator 2507 for extracting data from a received RF signal. An interface circuit 2505 interfaces with wired communication systems.

A petal configuration controller 2508 is coupled to each petal for providing for petal related information gathering and for petal related control. The petal configuration controller 2508 is coupled to a control circuit in the form of microcontroller 2509 for determining control data based on data and feedback received via the petal configuration controller and for providing the control data to the petal configuration controller 2508 for modifying configuration of a petal. Of course, since each petal is similar, control of individual petals or of all petals is possible independently or in conjunction one with another.

Numerous other embodiments may be envisaged without departing from the spirit or scope of the invention.

What is claimed is:

1. A wireless communication system comprising:
(a) a plurality of hubs, each hub comprising:
a plurality of radiators each associated with an oblong microcell and for radiating a narrow beam outward from the hub within the oblong microcell, different radiators for radiating within different oblong microcells, radiators associated with adjacent oblong microcells for radiating within different frequency ranges such that adjacent oblong microcells are frequency isolated and at least two spatially isolated oblong microcells within a same half of a rosette are associated with radiators for radiating within a same frequency range at the same time and are for radiating beams having sufficiently low side lobe levels for providing spatial isolation;
a plurality of modulators each for modulating a signal based on data received and for providing the modulated signal to a radiator from the plurality of radiators;
a receiver for receiving a message including transmission information relating to at least one other hub of the plurality of hubs, the transmission information comprising at least one of a location, an identification address, and a radio emission characteristic of the at least one other hub of the plurality of hubs;
(b) a processor for determining a system configuration, The system configuration including at least one of a frequency of an oblong microcell, an angle of an oblong microcell, effective isotropic radiated power (EIRP) of an oblong microcell, and timing information for communicating within an oblong microcell of at least one hub of the plurality of hubs, based on at least the transmission information and for providing a configuration signal relating to the determined system configuration wherein the system configuration is for limiting inter-hub radio interference; and,
(c) a control means for controlling at least one hub of the plurality of hubs within the wireless communication system in response to the configuration signal.

2. A wireless communication system according to claim 1, comprising:
a remote receiver having a feedback transmitter for transmitting a signal relating to a hub to at least one other hub of the plurality of hubs.

3. A wireless communication system according to claim 2, further comprising;
a global positioning sensor for sensing a location of the hub;
wherein the feedback transmitter is also for providing feedback relating to a sensed location to at least one other hub of the plurality of hubs.

4. A wireless communication system according to claim 2, wherein the processor includes means for determining from the message and a sensed location of at least one other hub of the plurality of hubs whether signals transmitted from the at least one other hub of the plurality of hubs are a potential cause of interference at the sensed location, and when the signals are a potential source of the interference, providing the configuration signal to the control means for controlling the hub to reduce the interference.

5. A wireless communication system according to claim 1, wherein the control means is for adjusting the effective isotropic radiated power (EIRP) of at least one radiator from the plurality of radiators of at least one hub of the plurality of hubs.

6. A wireless communication system as defined in claim 5, the hub comprising:
radiators associated with at least 16 microcells disposed radially about the system and
wherein some radiators are for radiating at a same frequency range, wherein radiators for radiating at a same frequency range are for radiating with a same effective isotropic radiated power (EIRP).

7. A wireless communication system according to claim 1, wherein some radiators are for radiating at a same frequency range, wherein sidelobe levels are below a maximum level based on beam widths of the narrow beams, modulation techniques employed within the modulator, and environmental factors related to scattering of radiation within a cell according to the following equation:

$$\frac{C}{I_0} = |10\log(N-1) + S_L + \alpha_j|$$

wherein $C/I_0$ is a carrier to interference ratio and is a threshold in dB for operation of a demodulator of the modulated signal at a known performance level with $I_0$, the interference noise, substantially greater than thermal noise $N_0$, N is equal to a number of like frequency petals within a rosette, $S_L$ is mean sidelobe level of the radiators at angles greater $(M-0.5) \times (BW_h)$ away from peak free space main lobe of the beam where $BW_h$ is the azimuth width of the individual microcell, and $\alpha_f$ is dependent upon environmental factors associated with multipath scattering and represents a degradation of sidelobe level of radiation radiated by the radiators as a value expressed in dB.

8. A wireless communication system according to claim 7, wherein radiators associated with the at least 16 microcells disposed radially about the system are such that each microcell, microcell$_1$ ... microcell$_{16}$ are arranged in R repeating patterns of M microcells such that microcell$_i$ and microcell$_{M+1}$ are associated with radiators for radiating within a same frequency range and such that microcell$_{i+1}$ ... microcell$_{M+i-1}$ are associated with radiators for radiating within different frequency ranges and wherein each beam has a specified side lobe suppression level $S_L$ at angles greater than $(M-0.5) \times (BW_h)$ away from the free space main lobe of the beam where $BW_h$ is the width of the individual microcell.

9. A wireless communication system according to claim 1, wherein the frequency ranges are within the frequency range of 5–6 GHz and wherein during use the radiators are directed below the horizon by at least 3 degrees and radiate with sidelobe power spectral densities calculated by the formula: <PSD=19−0.711×(A-5) dBm/MHz> for elevation angles above the horizon at 5 degrees<A<40 degrees.

10. A wireless communication system according to claim 1 wherein the message comprises a radio frequency management message.

11. A wireless communication system according to claim 4, wherein the control means comprises a mechanism for rotating the hub such that a signal at a first wavelength is directed in a direction other than its direction prior to rotation of the hub.

12. A wireless communication system according to claim 4 wherein the control means comprises an electronic control circuit for rotating the signals emitted from the hub about the system such that a signal at a first wavelength is directed in a direction other than its direction prior to rotation of the signals emitted from the hub.

13. A wireless communication system according to claim 4 wherein the control means comprises a mechanism for tilting of radiators of the hub relative to the ground to reduce interference with satellites and/or satellite receivers.

14. A wireless communication system according to claim 4, comprising:
a detector for detecting interference caused by the hub; and
a feedback transmitter for providing a signal relating to the detected interference to at least one other hub of the plurality of hubs within the wireless communication system.

15. A wireless communication system according to claim 4, wherein sidelobe levels are below a maximum level based on beam widths of the narrow beams, modulation techniques employed within the modulator, and environmental factors related to scattering of radiation within a cell according to the following equation $$\frac{C}{I_0} = |10\log(N-1) + S_L + \alpha_j|$$

wherein $C/I_0$ is a carrier to interference ratio and is a threshold in dB for operation of a demodulator of the modulated signal at a known performance level with $I_0$, the interference noise, substantially greater than thermal noise $N_0$, N is equal to a number of like frequency petals within a rosette, $S_L$ is mean sidelobe level of the radiators at angles greater $(M-0.5) \times (BW_h)$ away from peak free space main lobe of the beam where $BW_h$ is the azimuth width of the individual microcell, and $\alpha_f$ is dependent upon environmental factors associated with multipath scattering and represents a degradation of sidelobe level of radiation radiated by the radiators as a value expressed in dB.

16. A wireless communication system according to claim 15, wherein radiators associated with the at least 16 microcells disposed radially about the hub are such that each microcell, microcell$_1$, ... microcell$_{16}$ are arranged in R repeating patterns of M microcells such that microcell$_i$ and microcell$_{M+i}$ are associated with radiators for radiating within a same frequency range and such that microcell$_{i+1}$ ... microcell$_{M+i-1}$ are associated with radiators for radiating within different frequency ranges and wherein each beam has a specified side lobe suppression level $S_L$ at angles greater than $(M-0.5) \times (BW_h)$ away from the free space main lobe of the beam where $BW_h$ is the width of the individual microcell.

17. A wireless communication system as defined in claim 1, wherein the hub comprises means for dynamically allocating one of at least two frequency ranges associated with at least two microcells to a subscriber receiving data radiated from the system and located within an area inside all of the at least two microcells, the allocation based on available bandwidth and the configuration signal.

18. A wireless communication system according to claim 1, wherein the frequency ranges are within the frequency range of 5–6 GHz and wherein during use the radiators are directed below the horizon by at least 3 degrees and radiate with sidelobe power spectral densities calculated by the formula: <PSD=19−0.711×(A-5) dBm/MHz> for elevation angles above the horizon 5 degrees<A<40 degrees.

19. A wireless communication system as according to claim 10, wherein the hub comprises:
   a messaging circuit for generating a radio frequency management message indicating data relating to at least one hub of the plurality of hubs.

20. A wireless communication system as defined in claim 1, wherein the hub comprises a plurality of directional receivers each associated with an oblong microcell and for receiving a signal transmitted within the oblong microcell, the directional receivers having sufficiently low sidelobes to provide spatial isolation from signals radiated by radiators associated with other microcells.

21. A wireless communication system as defined in claim 1 wherein the hub comprises:
   a detector for detecting interference with signals other than those transmitted by at least one other hub of the plurality of hubs of the wireless communication system;
   a second processor for classifying the interference to determine a source thereof and, when the source has a higher priority than the hub, for providing a feedback signal relating to the detected interference; and,
   a control circuit for changing a characteristic of the rosette based on the feedback signal, wherein the change is for limiting the detected interference.

22. A communication system as defined in claim 21, wherein the control circuit is for temporarily preventing transmission from the hub within a frequency and location related to the detected interference.

23. A communication system as defined in claim 22, wherein each hub is substantially identical.

* * * * *

UNITED STATES PATENT AND TRADEMARK OFFICE
CERTIFICATE OF CORRECTION

PATENT NO. : 7,194,269 B2
APPLICATION NO. : 09/984403
DATED : March 20, 2007
INVENTOR(S) : John T. Sydor Page 1 of 1

It is certified that error appears in the above-identified patent and that said Letters Patent is hereby corrected as shown below:

Column 17, line 58, in the description, that portion of the equation "$a_j$" should be changed to -- $a_f$ --

Column 31, line 22, in claim 7, that portion of the equation "$a_j$" should be changed to -- $a_f$ --

Column 31, lines 41 and 42, in claim 8, "microcell$_{M+1}$" should be changed to -- microcell$_{M+i}$ --

Column 32, line 25, in claim 15, that portion of the equation "$a_j$" should be changed to -- $a_f$ --

Signed and Sealed this

Twenty-seventh Day of April, 2010

David J. Kappos
*Director of the United States Patent and Trademark Office*